(12) United States Patent
Hirano et al.

(10) Patent No.: US 11,243,670 B2
(45) Date of Patent: Feb. 8, 2022

(54) INFORMATION PROCESSING SYSTEM, INFORMATION PROCESSING APPARATUS, INFORMATION PROCESSING METHOD AND NON-TRANSITORY COMPUTER READABLE MEDIUM

(71) Applicant: FUJIFILM Business Innovation Corp., Tokyo (JP)

(72) Inventors: Yasuhiro Hirano, Kanagawa (JP); Kimitake Hasuike, Kanagawa (JP); Tomohito Takagi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 183 days.

(21) Appl. No.: 16/178,611

(22) Filed: Nov. 2, 2018

(65) Prior Publication Data
US 2019/0146646 A1  May 16, 2019

(30) Foreign Application Priority Data
Nov. 14, 2017  (JP) .............................. JP2017-219434

(51) Int. Cl.
*G06F 3/0484* (2013.01)
*G06F 3/0482* (2013.01)
(Continued)

(52) U.S. Cl.
CPC .......... *G06F 3/0484* (2013.01); *G06F 3/0482* (2013.01); *G06Q 10/10* (2013.01); *H04L 51/04* (2013.01); *H04M 1/00* (2013.01); *G06F 2203/04803* (2013.01); *H04M 1/72436* (2021.01)

(58) Field of Classification Search
CPC .. G06F 3/0481; G06F 3/0482; G06F 3/04842; G06F 3/0484; G06F 3/1446; G06F 40/14
See application file for complete search history.

(56) References Cited

U.S. PATENT DOCUMENTS 9,298,355 B1  3/2016  Beausoleil et al.
9,300,609 B1  3/2016  Beausoleil et al.
(Continued)

FOREIGN PATENT DOCUMENTS

| | | |
|---|---|---|
| JP | 2014219767 | 11/2014 |
| JP | 2016184404 | 10/2016 |
| WO | 2014178364 | 11/2014 |

OTHER PUBLICATIONS

Office Action of Japan Counterpart Application, with English translation thereof, dated Jul. 6, 2021, pp. 1-9.

*Primary Examiner* — Justin S Lee
(74) *Attorney, Agent, or Firm* — JCIPRNET

(57) ABSTRACT

An information processing system includes a memory, a content display, an extraction unit, and a message display. The memory stores multiple pieces of content and multiple messages transmitted by multiple users. The content display displays the multiple pieces of content. The extraction unit extracts multiple messages from the memory if a user selects at least one piece of content of the multiple displayed pieces of content. The multiple extracted messages refer to the at least one piece of content or have the at least one piece of content attached to the multiple extracted messages. The message display displays the multiple messages extracted by the extraction unit.

23 Claims, 16 Drawing Sheets

(51) Int. Cl.
*G06Q 10/10* (2012.01)
*H04L 12/58* (2006.01)
*H04M 1/00* (2006.01)
*H04M 1/72436* (2021.01)

(56) References Cited

U.S. PATENT DOCUMENTS

| | | |
|---|---|---|
| 9,395,892 B1 | 7/2016 | Beausoleil et al. |
| 9,395,893 B1 | 7/2016 | Beausoleil et al. |
| 9,600,498 B2 * | 3/2017 | Ohwa .................. G06F 40/103 |
| 9,715,534 B2 | 7/2017 | Beausoleil et al. |
| 9,959,327 B2 | 5/2018 | Beausoleil et al. |
| 10,042,900 B2 | 8/2018 | Beausoleil et al. |
| 10,216,810 B2 | 2/2019 | Beausoleil et al. |
| 10,452,670 B2 | 10/2019 | Beausoleil et al. |
| 10,558,677 B2 | 2/2020 | Beausoleil et al. |
| 10,635,684 B2 | 4/2020 | Beausoleil et al. |
| 10,997,188 B2 | 5/2021 | Beausoleil et al. |
| 10,997,189 B2 | 5/2021 | Beausoleil et al. |
| 11,016,987 B2 | 5/2021 | Beausoleil et al. |
| 2008/0104523 A1 * | 5/2008 | Umeki .................... H04L 51/16 715/751 |
| 2010/0188421 A1 * | 7/2010 | Ohwa .................... G06F 40/186 345/641 |
| 2013/0006403 A1 * | 1/2013 | Moore .................... A63F 13/35 700/92 |
| 2013/0151635 A1 * | 6/2013 | Soundrapandian ..... H04L 67/24 709/206 |
| 2014/0052576 A1 * | 2/2014 | Zelenka ............. G06Q 30/0613 705/26.41 |
| 2014/0244738 A1 * | 8/2014 | Ryden ...................... H04L 67/14 709/204 |
| 2014/0244739 A1 * | 8/2014 | Gardenfors ............. H04L 67/38 709/204 |
| 2014/0258416 A1 * | 9/2014 | Kurupacheril ...... H04L 65/4023 709/205 |
| 2014/0358846 A1 * | 12/2014 | Hartlaub ................ G06F 16/904 707/607 |
| 2015/0033143 A1 * | 1/2015 | Lee .......................... H04L 51/16 715/752 |
| 2015/0121255 A1 * | 4/2015 | Lee ......................... G06Q 10/10 715/758 |
| 2016/0036755 A1 * | 2/2016 | Yamada .................. G06Q 50/10 455/456.3 |
| 2016/0202889 A1 * | 7/2016 | Shin ....................... G06F 3/0482 715/758 |
| 2016/0246769 A1 * | 8/2016 | Screen ................ H04L 67/1097 |
| 2017/0102833 A1 * | 4/2017 | Kodali ...................... G06F 9/52 |
| 2017/0118152 A1 * | 4/2017 | Lee .......................... H04L 67/20 |
| 2017/0289085 A1 * | 10/2017 | Kim ........................ H04L 51/16 |
| 2018/0012194 A1 * | 1/2018 | Aoki ..................... H04L 65/403 |
| 2018/0121406 A1 * | 5/2018 | Bliss ..................... G06F 40/174 |

* cited by examiner

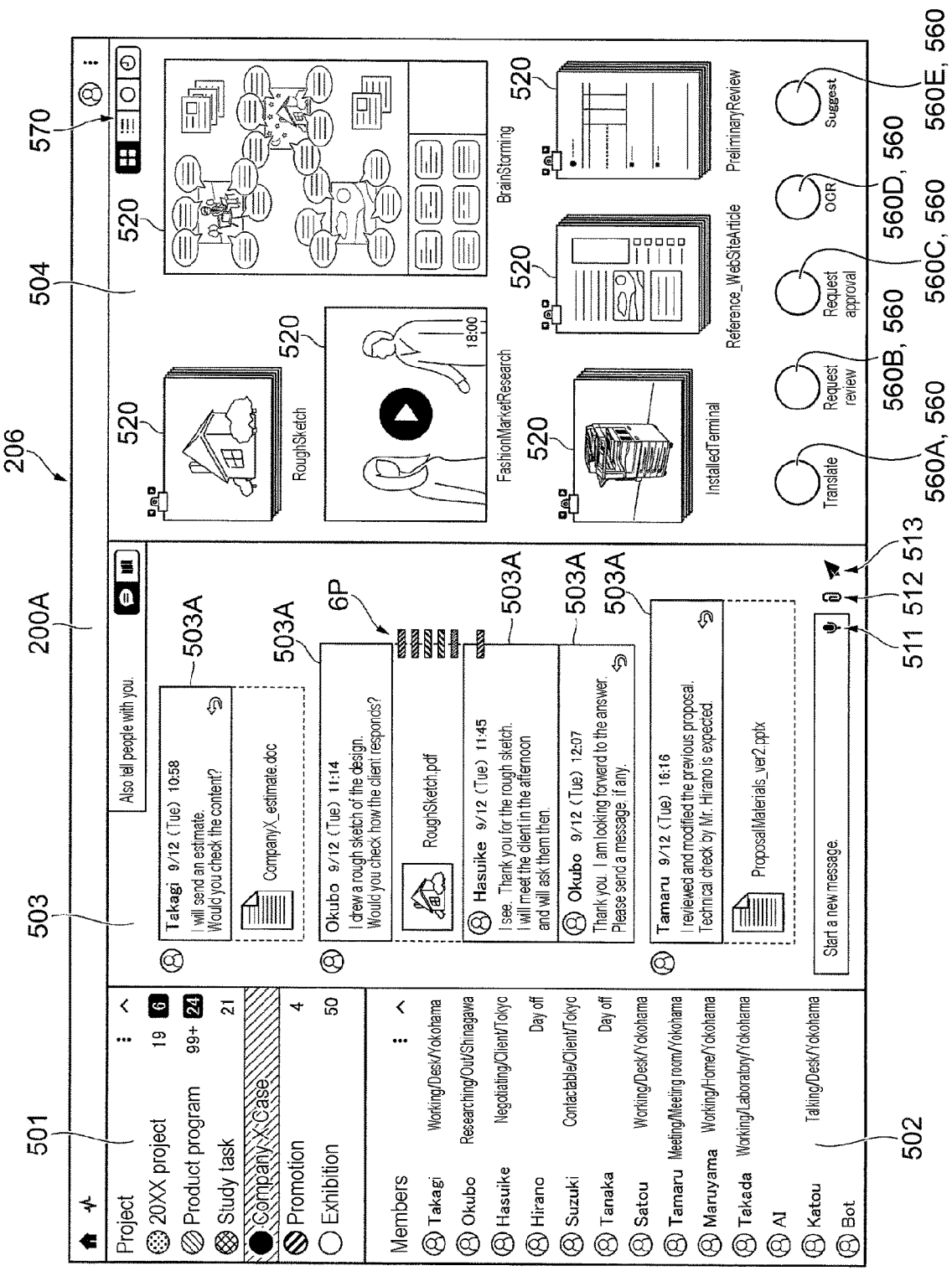

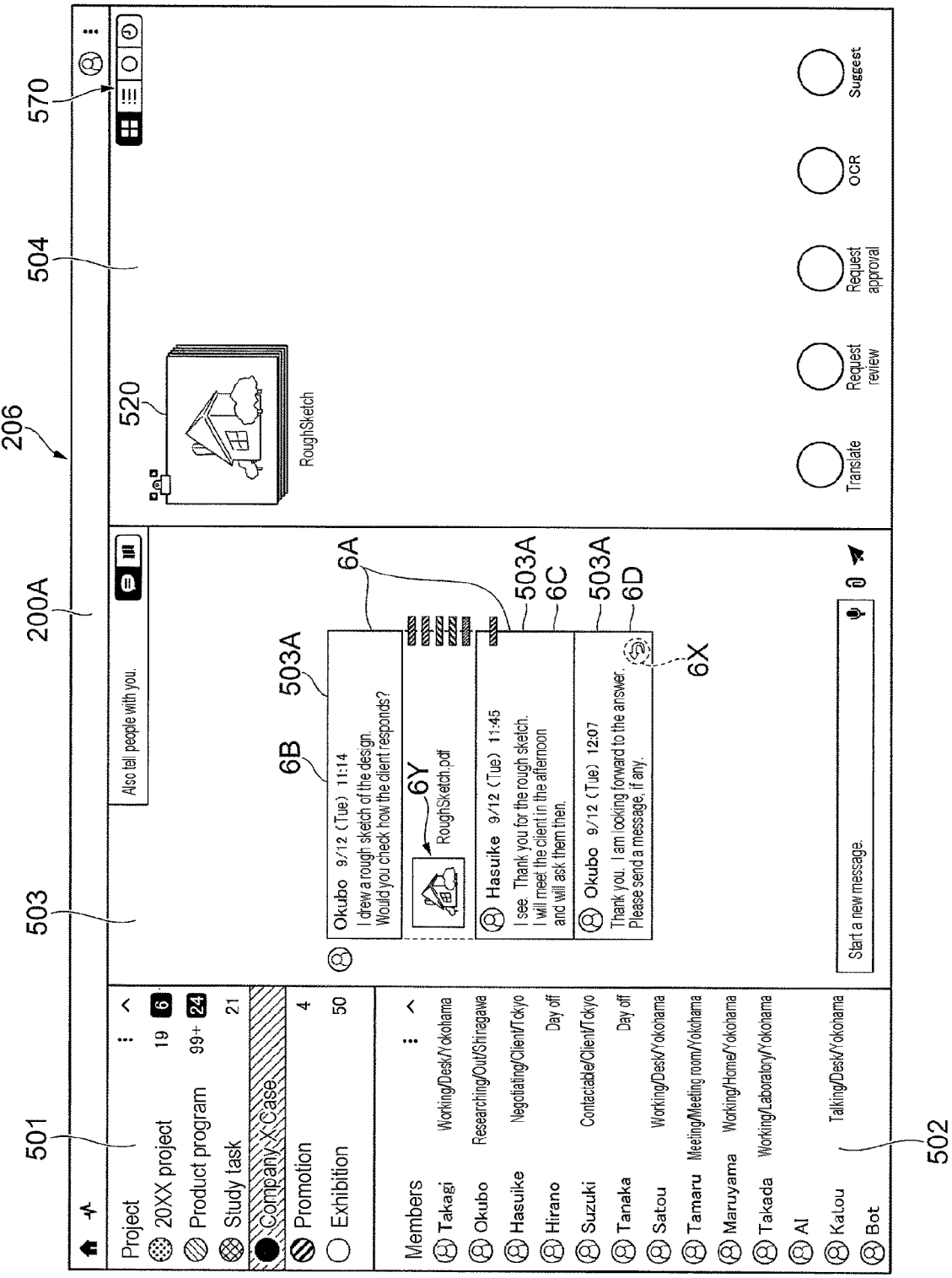

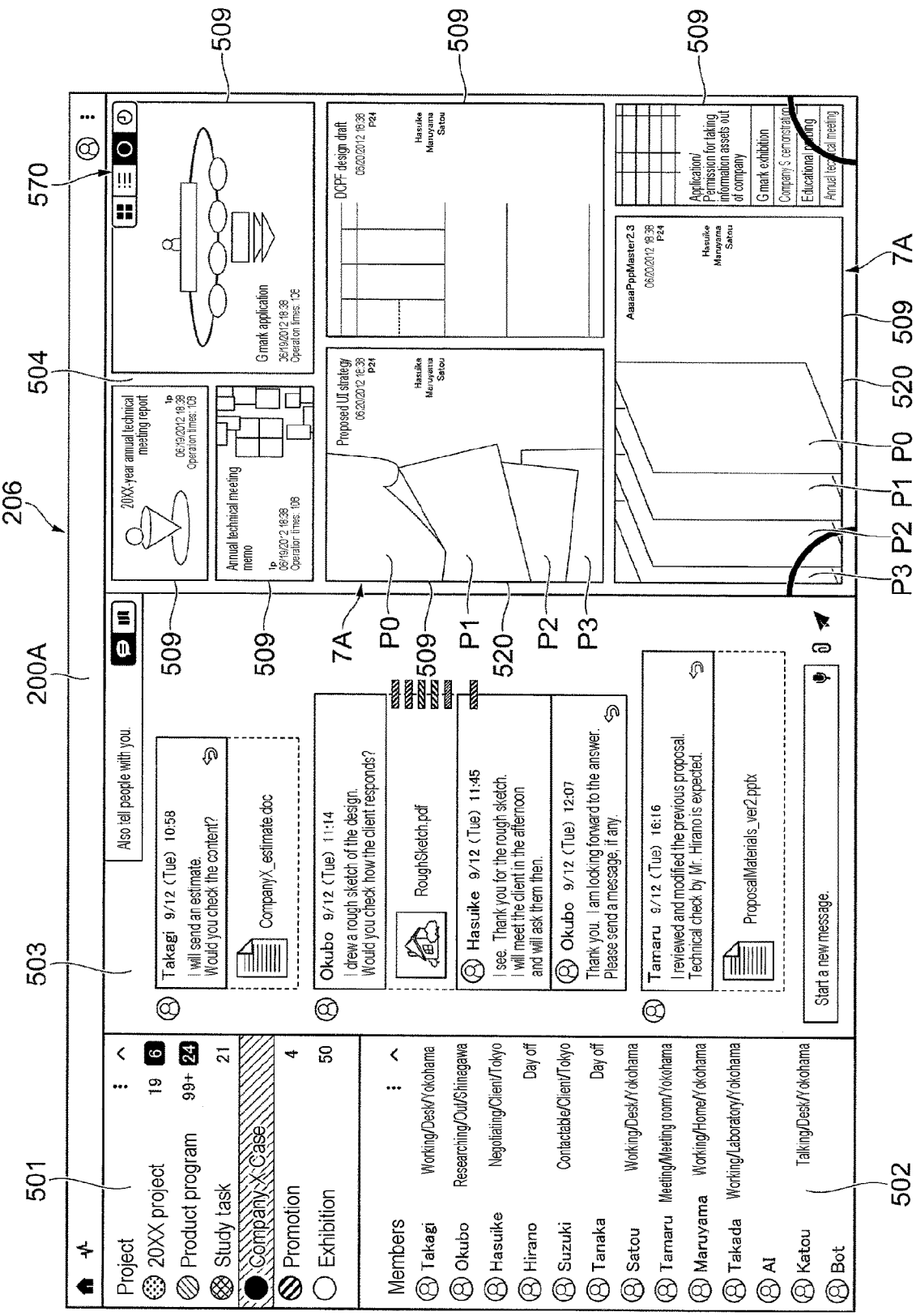

INFORMATION PROCESSING SYSTEM, INFORMATION PROCESSING APPARATUS, INFORMATION PROCESSING METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-219434 filed Nov. 14, 2017.

BACKGROUND (i) Technical Field

The present invention relates to an information processing system, an information processing apparatus, and a non-transitory computer readable medium.

(ii) Related Art

As a method for extracting a message related to content selected by a user, a method for extracting only one message connected to the content on a one-to-one correspondence basis has been known. However, if multiple users transmit messages related to the content, and if the one message only is extracted, it is difficult to recognize communication related to the content performed by the multiple users.

SUMMARY

According to an aspect of the invention, there is provided an information processing system including a memory, a content display, an extraction unit, and a message display. The memory stores multiple pieces of content and multiple messages transmitted by multiple users. The content display displays the multiple pieces of content. The extraction unit extracts multiple messages from the memory if a user selects at least one piece of content of the multiple displayed pieces of content. The multiple extracted messages refer to the at least one piece of content or have the at least one piece of content attached to the multiple extracted messages. The message display displays the multiple messages extracted by the extraction unit.

BRIEF DESCRIPTION OF THE DRAWINGS

Exemplary embodiments of the present invention will be described in detail based on the following figures, wherein:

FIG. 6A is a view illustrating an example display screen of a display provided to each terminal apparatus;

FIG. 6B is a view illustrating the display screen displayed after one of pieces of content displayed in a fourth display area is selected;

FIG. 7 is a view illustrating an example display screen displayed after display in the fourth display area is changed;

DETAILED DESCRIPTION

Hereinafter, exemplary embodiments of the present invention will be described with reference to the attached drawings.

Figure 1:
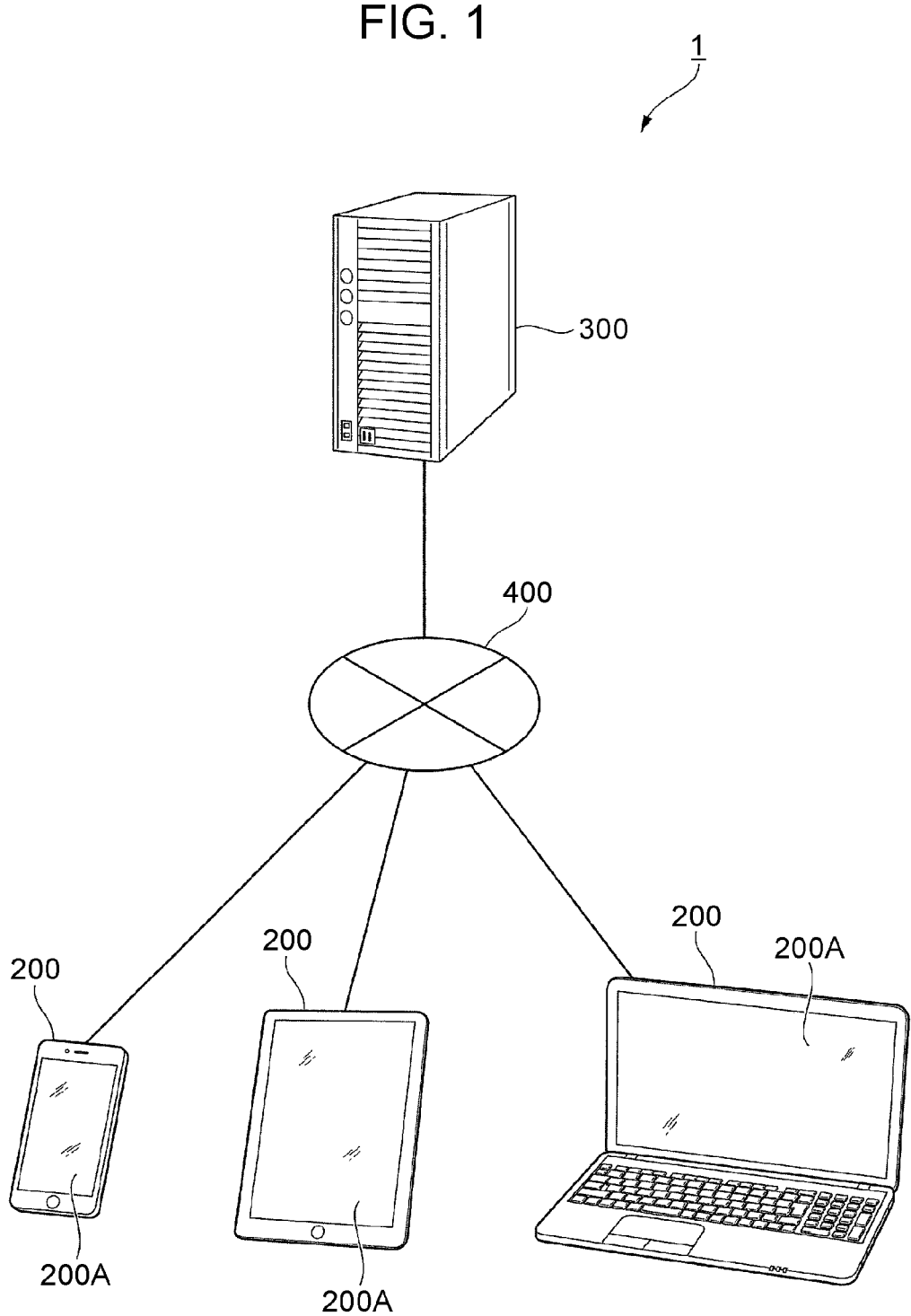
FIG. 1 is a view illustrating the overall configuration of an information processing system.

FIG. 1 is a view illustrating the overall configuration of an information processing system 1.

The information processing system 1 is provided with a management server 300 that is an example of an information processing apparatus. Further, the information processing system 1 is provided with multiple terminal apparatuses 200 operated by users. Each terminal apparatus 200 is configured as a computer.

Specifically, the terminal apparatus 200 is configured as, for example, a smartphone, a tablet, or a personal computer (PC). The terminal apparatus 200 communicates with the management server 300 via a communication network 400 such as the Internet.

Note that FIG. 1 illustrates a case where three terminal apparatuses 200 are provided, but the number of terminal apparatuses 200 is not particularly limited.

Description of Apparatuses

Figure 2:
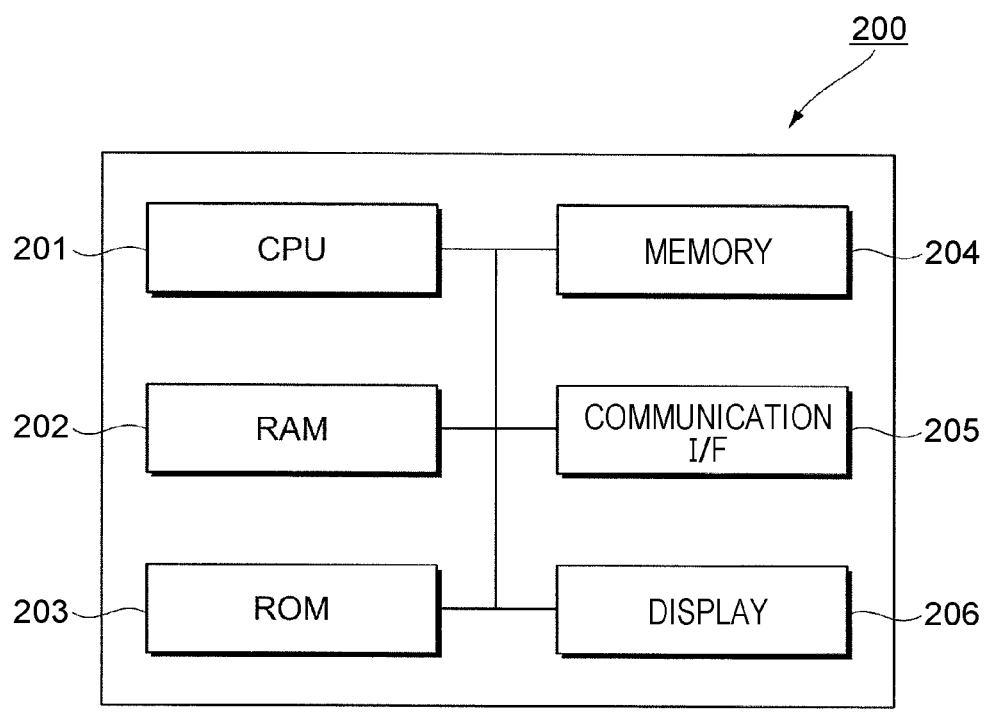
FIG. 2 is a view illustrating the hardware configuration of each of terminal apparatuses.

FIG. 2 is a view illustrating the hardware configuration of each terminal apparatus 200.

The terminal apparatus 200 is configured as a computer and is provided with a CPU 201, a random access memory (RAM) 202, and a read only memory (ROM) 203. The terminal apparatus 200 is also provided with a memory 204 configured as a hard disk device, a flash memory, or the like.

Further, the terminal apparatus 200 is also provided with a communication interface (communication I/F) 205 for communicating with external apparatuses.

Further, the terminal apparatus 200 is provided with a display 206 functioning as part of a content display and a message display.

The display 206 includes, for example, a monitor using a touch panel system. The display 206 receives an operation performed by a user and displays information for the user.

A program to be run by the CPU 201 may be provided to the terminal apparatus 200 in a state of being stored in a computer readable recording medium such as a magnetic recording medium (such as a magnetic tape or a magnetic disk), an optical recording medium (such as an optical disk), a magneto-optical recording medium, or a semiconductor memory. The program to be run by the CPU 201 may also be downloaded to the terminal apparatus 200 by using a communication medium such as the Internet.

Figure 3:
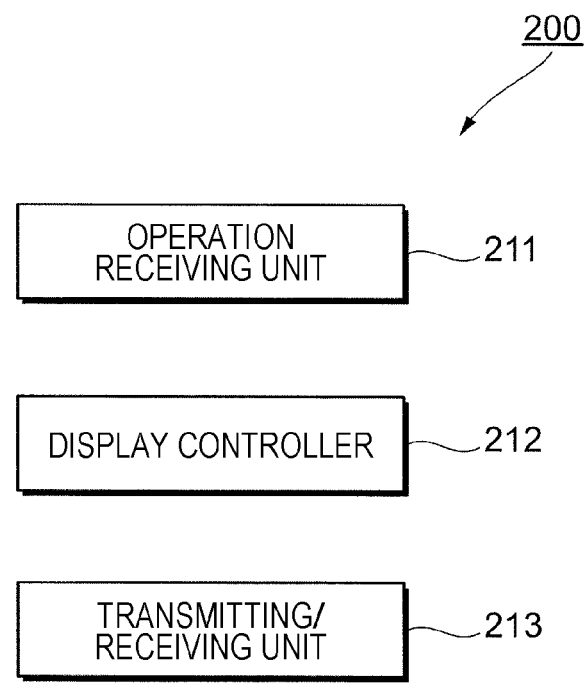
FIG. 3 is a view illustrating functional units implemented by a central processing unit (CPU) or the like of the terminal apparatus.

FIG. 3 is a view illustrating functional units implemented by the CPU 201 or the like of the terminal apparatus 200. Note that FIG. 3 illustrates only functional units that relate to a display process described later.

As illustrated in FIG. 3, the terminal apparatus 200 includes an operation receiving unit 211, a display controller 212, and a transmitting/receiving unit 213.

The operation receiving unit 211 receives an operation performed on the terminal apparatus 200 by an operator. Specifically, the operation receiving unit 211 receives output from a mouse or the like operated by the user, output from the display 206 if the display 206 uses a touch panel system, or the like and thereby receives the operation performed on the terminal apparatus 200 by the user (such as an operation for selecting a piece of content).

The display controller 212 functioning as part of the content display and the message display generates a signal for controlling the display 206 and thereby performs display control of the display 206.

The transmitting/receiving unit 213 transmits and receives information to and from the management server 300.

Figure 4:
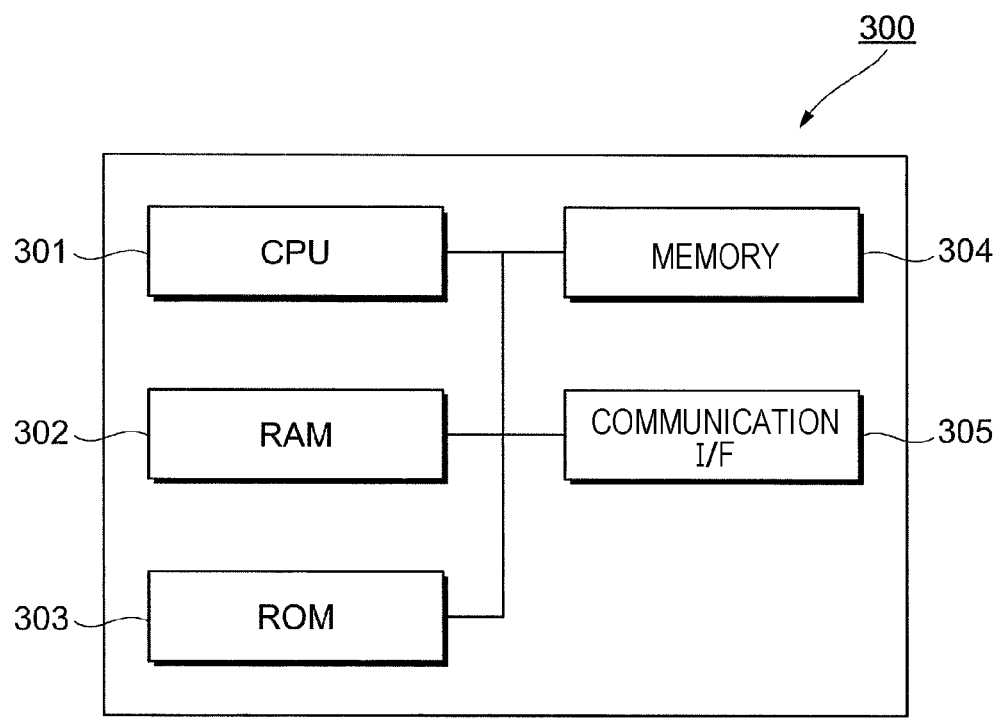
FIG. 4 is a view illustrating the hardware configuration of a management server.

FIG. 4 is a view illustrating the hardware configuration of the management server 300.

The management server 300 that is the example of the information processing apparatus is configured as a computer and is provided with a CPU 301, a RAM 302, and a ROM 303. The management server 300 is also provided with a memory 304 configured as a hard disk device or the like. Further, the management server 300 is provided with a communication I/F 305 for communicating with external apparatuses.

A program to be run by the CPU 301 may be provided to the management server 300 in a state of being stored in a computer readable recording medium such as a magnetic recording medium (such as a magnetic tape or a magnetic disk), an optical recording medium (such as an optical disk), a magneto-optical recording medium, or a semiconductor memory. The program to be run by the CPU 301 may also be downloaded to the management server 300 by using a communication medium such as the Internet.

Figure 5:
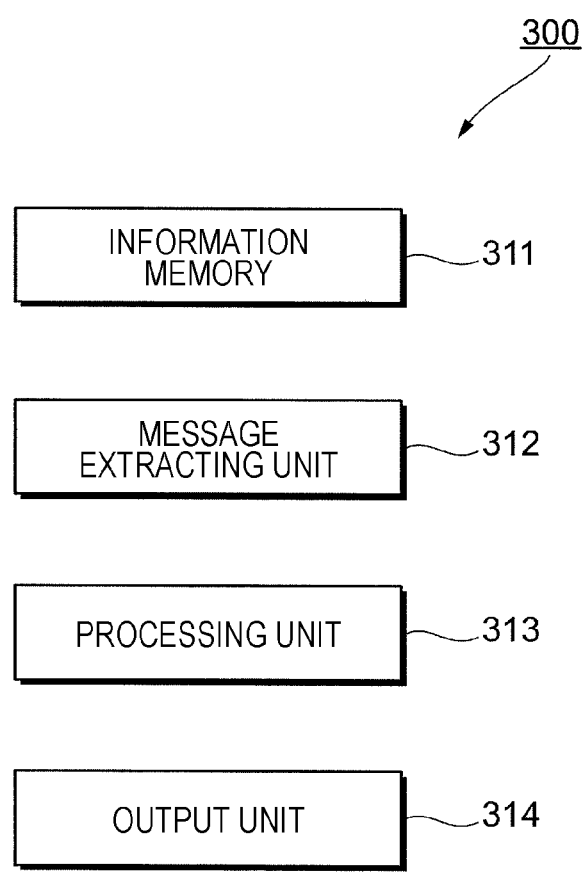
FIG. 5 is a view illustrating the functional units implemented by a CPU or the like of the management server.

FIG. 5 is a view illustrating functional units implemented by the CPU 301 or the like of the management server 300. Note that FIG. 5 illustrates only functional units that relate to the display process described later.

As illustrated in FIG. 5, the management server 300 includes an information memory 311, a message extracting unit 312, a processing unit 313, and an output unit 314.

The information memory 311 that is an example of a memory stores therein multiple pieces of content and multiple messages transmitted from multiple users. The information memory 311 stores each piece of content and at least one message related to the piece of content in connection with each other. More specifically, the information memory 311 stores therein, for example, each piece of content and a message to which the piece of content is attached, in connection with each other.

When the user selects a piece of content, the message extracting unit 312 that is an example of an extraction unit extracts, from the information memory 311, multiple messages that refer to the piece of content or to which the piece of content is attached.

To extract the messages referring to the piece of content, the message extracting unit 312 first acquires, for example, information included in the piece of content, such as the title of the selected piece of content. The message extracting unit 312 then extracts messages including the acquired information.

The processing unit 313 that is an example of a processing unit performs predetermined processing such as processing associated in advance with an operation performed by the operator by using the terminal apparatus 200.

The output unit 314 that is an example of an output unit outputs (transmits) information to the terminal apparatus 200 or the like.

Specific Example Processing

FIG. 6A is a view illustrating an example of a display screen 200A (see FIG. 1) of the display 206 provided to each terminal apparatus 200.

Note that display on the display 206 is performed in response to an instruction from the management server 300. Specifically, the output unit 314 of the management server 300 outputs a display-related instruction to the terminal apparatus 200, and the display controller 212 of the terminal apparatus 200 performs the display control of the display 206 in response to the instruction.

Note that the display screen 200A described with reference to FIG. 6A and succeeding drawings is used for managing projects executed by multiple users.

The display screen 200A is shared by the multiple users. When one of the users accesses the management server 300 by using the terminal apparatus 200, the terminal apparatus 200 of the user displays the shared display screen 200A.

The display screen 200A illustrated in FIG. 6A is provided with multiple display areas. Specifically, four display areas that are a first display area 501, a second display area 502, a third display area 503, and a fourth display area 504 are provided.

The first display area 501 located in the upper left part of FIG. 6A is a display area for a project list, and multiple ongoing projects are displayed in series.

In this exemplary embodiment, when a project is selected in the first display area 501, display in the other display areas that are the second display area 502 to the fourth display area 504 are changed. In these display areas, display is performed in accordance with the selected project.

The second display area 502 is a display area for displaying project members who implement the project, and project members of a corresponding one of the projects are displayed therein.

In the second display area 502, the displayed project members vary depending on the project selected by the user.

The third display area 503 is a message display area, and multiple messages 503A transmitted by the project members are displayed therein. Also in the third display area 503, the displayed messages 503A vary depending on the project selected by the user.

In this exemplary embodiment, the term "message" denotes information intended by one of the project members to be notified to the other project members.

The messages 503A are displayed in the third display area 503 in a time series.

More specifically, in this example, the messages 503A are displayed in such a manner that the most recent message 503A is located at the lowermost position and less recent messages 503A are located at the upper positions.

On the contrary, the messages 503A may be displayed in such a manner that the most recent message 503A is located at the uppermost position and less recent messages 503A may be located at the lower positions.

Further, in the third display area 503, information regarding each of the transmitters who transmits the corresponding message 503A (information such as a name identifying the transmitter) and information regarding the transmission date and time of the message 503A are displayed in association with the message 503A.

Further, in this exemplary embodiment, as denoted by a reference sign 6P, each project member may add an image indicating a tag to a message 503A. This enables recognition of, for example, a message 503A with highly evaluated by the project members and a message 503A of interest to the project members.

In a bottom portion of the third display area 503, a voice input button 511, a content attachment button 512, and a message transmission button 513 are displayed.

The messages 503A may also be input by the project members through voice input. To perform voice input, a project member selects (presses) the voice input button 511 and utters to the microphone (not illustrated).

A message 503A is thereby received and displayed in the third display area 503.

Note that as the message 503A displayed in the third display area 503, the message 503A itself input by the project member may be displayed. Alternatively, the message 503A may be translated by the processing unit 313 (see FIG. 5) and thereafter may be displayed.

The content attachment button 512 is a button operated by the project member when a piece of content (described later) is attached to a message 503A.

In this exemplary embodiment, when the content attachment button 512 is selected (pressed), a list of pieces of content (not illustrated) is displayed, and a piece of content selected from the list is attached to the message 503A.

The message transmission button 513 is a button to be pressed by the project member when the content of a message 503A to be transmitted is determined. After the project member presses the message transmission button 513, the terminal apparatus 200 operated by the project member transmits the message 503A to the management server 300.

In this exemplary embodiment, the management server 300 then receives the message 503A, and the message 503A is displayed on the terminal apparatuses 200 of the other users.

The fourth display area 504 is a content display area, and the display controller 212 (see FIG. 3) that functions as part of the content display displays images respectively depicting pieces of content related to a project (hereinafter, simply referred to as pieces of content 520) in the fourth display area 504.

More specifically, the multiple pieces of content 520 are displayed as thumbnail images in the fourth display area 504.

Note that the term "a piece of content" denotes a piece of information indicating a document, an image, voice, or the like.

It may be said that the piece of content is not only a text file but also a file related to a photo, a movie, or voice. It may also be said that the piece of content is not only a file but also a piece of information or the like indicating a web site (described later). In other words, it may be said that the piece of content includes a piece of information and that the piece of information handleable as a unit is a piece of content.

In the fourth display area 504 in this exemplary embodiment, the pieces of content 520 are visually displayed.

The fourth display area 504 is designed to allow the arrangement of the pieces of content 520 to be changed. For example, moving a piece of content 520 to a different position by performing a drag-and-drop operation enables the arrangement of the pieces of content 520 to be changed.

In addition, in this exemplary embodiment, superposing a piece of content 520 on a different piece of content 520 enables the multiple pieces of content 520 to be arranged at a position of one piece of content 520.

Although FIG. 6A illustrates the pieces of content 520 in a file format in the fourth display area 504, information or the like indicating a web site may also be united to a pieces of content 520, and thus information not in the file format is also displayed as a piece of content 520 in the fourth display area 504.

In this exemplary embodiment, if a message 503A is transmitted with a piece of content 520 attached thereto, the piece of content 520 is stored in the information memory 311.

More specifically, the piece of content 520 is stored in the information memory 311 together with the message 503A. In further explanation, the piece of content 520 is stored in connection (association) with the message 503A.

In other words, in this exemplary embodiment, the piece of content 520 and the message 503A are stored in the information memory 311, and in further explanation, the piece of content 520 is stored in the information memory 311 in connection (association) with the message 503A to which the piece of content 520 is attached.

This exemplary embodiment thereby enables the message 503A associated with the piece of content 520 to be recognized and, vice versa, enables the piece of content 520 associated with the message 503A to be recognized.

In additional explanation, in this exemplary embodiment, the information memory 311 that is the example of the memory stores the piece of content 520 and the message 503A related to the piece of content 520 in connection with each other.

Further, in this exemplary embodiment, when the message 503A is transmitted with the piece of content 520 attached thereto, the piece of content 520 is displayed in the fourth display area 504 that is the content display area, and the message 503A is displayed in the third display area 503 that is the message display area.

Note that the case where if the piece of content 520 is attached to the message 503A, the piece of content 520 is stored in the information memory 311 and further displayed in the fourth display area 504 has been described in this exemplary embodiment but is an example.

In another example, the piece of content 520 referred to in the message 503A may be acquired by performing a search through the Internet or the like, stored in the information memory 311, and further displayed in the fourth display area 504.

In addition, as illustrated in FIG. 6A, multiple selection images 560 are displayed in a bottom portion of the fourth display area 504 in this exemplary embodiment. One of the multiple selection images 560 is selected by the user when the user performs an operation for processing a piece of content 520.

Specifically, the five selection images 560 are displayed.

More specifically, in this exemplary embodiment, one of the selection images 560 to be selected for translation (hereinafter, a translation selection image 560A) and one of the selection images 560 to be selected for a review request (hereinafter, a review selection image 560B) are displayed.

Further, one of the selection images 560 to be selected for an approval request (hereinafter, an approval selection image 560C), one of the selection images 560 to be selected for optical character recognition (OCR) processing (hereinafter, an OCR selection image 560D), and one of the selection images 560 to be selected for a suggestion request (hereinafter, a suggestion selection image 560E) are displayed.

In this exemplary embodiment, when a drag-and-drop operation is performed from a piece of content 520 displayed in the fourth display area 504 to one of the selection images 560, processing associated with the selection image 560 is performed on the piece of content 520.

In other words, in this exemplary embodiment, when one of the pieces of content 520 displayed in the fourth display area 504 is moved to a position where the selection image 560 is displayed (a predetermined position on the display screen 200A), processing associated with the position is performed on the piece of content 520.

If the translation selection image 560A is selected (if the piece of content 520 is moved onto the translation selection image 560A), a document included in the piece of content 520 is translated, and the piece of content 520 including the document in a language different from the original language is generated.

More specifically, the processing unit 313 (see FIG. 5) executes a translation process and generates the piece of content 520 including the document in the language different from the original language.

If the review selection image 560B is selected (if the piece of content 520 is moved onto the review selection image 560B), a notification indicating that a review is requested of at least one project member predetermined for a review is provided.

More specifically, information indicating the project member who gives a review is displayed in the third display area 503 (the message display area) to indicate that a review is requested. The reviewer thereby gives a review of the piece of content 520.

If the approval selection image 560C is selected (if the piece of content 520 is moved onto the approval selection image 560C), a notification indicating that approval is requested of at least one project member for approving the piece of content 520 is provided.

Specifically, information indicating the project member who approves the piece of content 520 is displayed in the third display area 503 (the message display area) to indicate that approval is requested. The project member for approving the piece of content 520 thereby approves or rejects the piece of content 520.

If the OCR selection image 560D is selected (if the piece of content 520 is moved onto the OCR selection image 560D), the processing unit 313 executes an OCR process of a document image in the piece of content 520.

If the suggestion selection image 560E is selected (if the piece of content 520 is moved onto the suggestion selection image 560E), the processing unit 313 searches for information related to the piece of content 520 and thereby identifies the information (identifies the information by searching the Internet or the information memory 311). The display controller 212 of the terminal apparatus 200 then displays the identified related information, for example, in the third display area 503 (the message display area).

Note that the above-described five selection images 560 may be used for not only the processing of the piece of content 520 but also processing of different information such as a message 503A.

Specifically, for example, if the translation selection image 560A is selected for a message 503A (if the message 503A is moved onto the translation selection image 560A), the message 503A may be translated, and thereby a message 503A in a different language from the original language may be generated.

In addition, for example, if the suggestion selection image 560E is selected for the message 503A, related information related to the message 503A may be identified, and then the related information may be displayed in the third display area 503 or the like.

Specifically, for example, if the message 503A indicates searching for a solution to an issue, for example, a solution to the issue may be suggested. Alternatively, for example, a person capable of addressing the issue may be identified and suggested.

In this exemplary embodiment, as illustrated in FIG. 6A, an operation part 570 is displayed in an upper right part of the fourth display area 504. The operation part 570 is provided for receiving, from the project members, an operation for changing the display format of the fourth display area 504. In this exemplary embodiment, when the user operates the operation part 570, and thereby the display in the fourth display area 504 is changed.

Specifically, in this exemplary embodiment, the pieces of content 520 are displayed in a display format in which the pieces of content 520 are displayed in a distributed state (the display format used for the fourth display area 504 illustrated in FIG. 6A), a display format in which the pieces of content 520 are displayed by forming a list, or by forming a lens view or the like.

Note that the four display areas shared by the multiple project members are displayed on the display screen 200A illustrated in FIG. 6A, but in addition to the displays (in addition to the first display area 501 to the fourth display area 504) on the display screen 200A illustrated in FIG. 6A, display areas for respective users (display areas that are not shared by the users but provided individually for the respective users) may be displayed.

In this case, if moving of a piece of content 520 is performed between, for example, an display area specially provided for one of the users and a shared display area, a personal piece of content 520 may be shared as a shared piece of content. On the contrary, if the shared piece of content 520 is copied into the personal display area, each user may obtain the personal piece of content 520.

FIG. 6B is a view illustrating the display screen 200A displayed after one of the pieces of content 520 is selected from among the pieces of content 520 displayed in the fourth display area 504.

More specifically, FIG. 6B is a view illustrating the display screen 200A displayed in a case where Takagi who is one of the project members selects a piece of content 520 from among the pieces of content 520 displayed in the fourth display area 504.

In this exemplary embodiment, if a project member (Takagi in this exemplary embodiment) selects at least one piece of content 520 from among the multiple pieces of content 520 displayed in the fourth display area 504, the display contents of the display screen 200A are changed.

Specifically, if the project member selects the piece of content 520, at least one message 503A related to the piece of content 520 is displayed on the display screen 200A.

Specifically, in this exemplary embodiment, if at least one piece of content 520 is selected from among the multiple pieces of content 520 displayed in the fourth display area 504, multiple messages 503A referring to the selected piece of content 520 or multiple messages 503A having the piece of content 520 attached thereto are extracted.

More specifically, if the piece of content 520 is selected, the message extracting unit 312 extracts, from the information memory 311, the messages 503A referring to the selected piece of content 520 or the messages 503A having the piece of content 520 attached thereto.

Subsequently, the display controller 212 that functions as the part of the message display displays the multiple extracted messages 503A in the third display area 503 as denoted by a reference sign 6A in FIG. 6B.

Note that a case where one of the project members (Takagi) selects a piece of content 520 that is Rough sketch from among the multiple pieces of content 520 displayed in the fourth display area 504 is exemplified in this exemplary embodiment.

In this case, the message extracting unit 312 extracts a message 503A that is a first message from Okubo (a message denoted by a reference sign 6B and also referred to as the first message 503A from Okubo) that is a message 503A referring to Rough sketch in this exemplary embodiment.

In additional explanation, in this case, the message extracting unit 312 extracts the message 503A referring to the title of the piece of content 520 that is information included in the piece of content 520.

Note that the message extracting unit 312 extracts the message 503A on the basis of the title of the piece of content 520, but the basis is not limited to the title. For example, the content of the piece of content 520 may be recognized, and thereby a message referring to the content (a message including the content of the piece of content 520) may be extracted.

It may be said that a message referring to a piece of content is a message including information based on which the piece of content is identifiable.

Further, in this exemplary embodiment, a message 503A from Hasuike (a message denoted by a reference sign 6C) includes the phrase "Thank you for the rough sketch".

Accordingly, the message extracting unit 312 also extracts the message 503A from Hasuike that refers to Rough sketch in this exemplary embodiment.

Subsequently in this exemplary embodiment, the output unit 314 of the management server 300 outputs information regarding the two messages 503A (the first message 503A from Okubo and the message 503A from Hasuike that are extracted by the message extracting unit 312).

The terminal apparatus 200 thereby displays the two messages 503A extracted by the message extracting unit 312 in the third display area 503.

Further, in this exemplary embodiment, the message extracting unit 312 also extracts a message 503A that is the second message from Okubo (also referred to as the second message 503A from Okubo) denoted by a reference sign 6D, and the terminal apparatus 200 also displays this message 503A.

Specifically, the message extracting unit 312 regards the second message 503A from Okubo as a message 503A related to the above-described message 503A from Hasuike (the message 503A denoted by the reference sign 6C) and thus extracts the second message 503A from Okubo.

The extracted second message 503A from Okubo is also displayed in the third display area 503.

Note that the second message 503A from Okubo is provided with a mark 6X indicating a reply (provided with information indicating a reply), and thus the second message 503A from Okubo is a return message responding to the message 503A from Hasuike.

In this case, the message extracting unit 312 regards the second message 503A from Okubo as a message related to the message 503A from Hasuike and thus extracts the second message 503A from Okubo.

In this exemplary embodiment, the second message 503A from Okubo is also displayed in the third display area 503.

Note that the return message responding to the message included in the two messages is the related message in this exemplary embodiment, but the related message is not limited to a return message.

If the message included in the two messages is a return message, a transmitted message that is the source of the return message is also a related message, and in this case, the message extracting unit 312 also extracts the transmitted message.

More specifically, for example, if the first message from Okubo is a return message, a transmitted message that is the source of the return message is a related message, and the message extracting unit 312 also extracts the transmitted message.

Further, in the display example illustrated in FIG. 6B, the messages 503A transmitted by the project members other than the project member who selects the piece of content are displayed in the third display area 503.

Specifically, the project member who selects the piece of content 520 is Takagi in this example, but the messages 503A transmitted by Okubo and Hasuike who are project members other than Takagi are displayed in the third display area 503.

In addition, as illustrated in FIG. 6B in this exemplary embodiment, if the user selects the piece of content 520, any piece of content 520 other than the selected piece of content 520 is erased in the fourth display area 504. This makes the selected piece of content 520 clearer.

Note that at least one more piece of content 520 may be left in the display without erasing all of the other pieces of content 520.

In additional explanation, in this exemplary embodiment, one or more pieces of content 520 included in the pieces of content other than the selected piece of content 520 are erased.

Compared with a case where all of the other pieces of content 520 are erased, the number of displayed pieces of content 520 is reduced, and the selected piece of content 520 is made clearer.

Although the case where the multiple messages 503A referring to the selected piece of content 520 are extracted has been described, the extraction is not limited to this. If there are multiple messages 503A having the selected piece of content 520 attached thereto, the multiple messages 503A having the piece of content 520 attached thereto may be extracted.

More specifically, for example, if there is a message having a piece of content attached thereto, and further if there is another message having the piece of content attached thereto, the two messages may be extracted.

Also in this case, if there is a different message related to the extracted message like the case above, such as a return message or a transmitted message, also the different related message is preferably extracted.

In this exemplary embodiment, if the piece of content 520 is selected, the multiple messages 503A related to the selected piece of content 520 are displayed in this manner in the third display area 503.

Note that the multiple messages 503A are displayed in such a manner as to be arranged in a predetermined order. Specifically, the multiple messages 503A are displayed in a time series. This enables the project members to find an intended message 503A easily.

Further, as denoted by a reference sign 6Y in FIG. 6B in this exemplary embodiment, an image representing the piece of content 520 selected by the project member is also displayed in the third display area 503 that is the message display area.

More specifically, a thumbnail image representing the piece of content 520 selected by the project member is displayed also in the third display area 503.

Further, in this exemplary embodiment, the image representing the piece of content 520 selected by the project member is arranged between the two messages 503A referring to the piece of content 520 (the two messages 503A denoted by the reference sign 6A).

As described above, if the image representing the piece of content 520 selected by the project member is displayed also in the third display area 503, it is possible to recognize, also in the third display area 503, which one of the pieces of content 520 is selected by the project member.

In addition, if the selected piece of content 520 is displayed also in the third display area 503 that is the message display area as described above, the correspondence between the message 503A and the piece of content 520 is displayed more clearly compared with a case where the selected piece of content 520 is displayed only in the fourth display area 504.

Further, in this exemplary embodiment as illustrated in FIG. 6B, the piece of content 520 to be displayed and the multiple messages 503A to be displayed are displayed on the shared display screen 200A.

In addition, in this exemplary embodiment, the piece of content 520 is displayed in one of display areas adjacent to each other, and the multiple messages 503A are displayed in the other display area.

Specifically, in this exemplary embodiment, the third display area 503 and the fourth display area 504 that are adjacent to each other are provided. The piece of content 520 is displayed in the fourth display area 504 that is one of the display areas, and the multiple messages 503A are displayed in the third display area 503 that is the other display area.

The correspondence between the piece of content 520 and the messages 503A is recognized more easily than in a case where the piece of content 520 and the multiple messages 503A are displayed on the respective display screens 200A and a case where the piece of content 520 and the multiple messages 503A are arranged in respective display areas spaced away from each other.

FIG. 7 is a view illustrating an example of the display screen 200A displayed after the display of the fourth display area 504 is changed.

In this exemplary embodiment, the operation part 570 for changing the display format of the fourth display area 504 is provided as described above. When a project member operates the operation part 570, the display of the terminal apparatus 200 of the project member is changed.

FIG. 7 illustrates the display screen 200A displayed after the display is changed. On the display screen 200A, pages P1 to P3 that are pages different from a cover P0 are displayed in at least one piece of content 520 (in each of the two pieces of content 520 denoted by a reference sign 7A).

This enables the content of the pieces of content 520 to be verified on the display screen 200A illustrated in FIG. 7 without opening the pieces of content 520.

To display a page different from the cover P0, a page satisfying a predetermined condition is displayed. Specifically, for example, a page highly frequently referred to by the user is displayed.

Note that the pages different from the cover P0 are displayed in the at least one piece of content 520 on the display screen 200A illustrated in FIG. 7, but the pages different from the cover P0 may be displayed in all of the pieces of content 520 in the fourth display area 504.

Further, the display screen 200A illustrated in FIG. 7 have the pieces of content 520 of different sizes (frames 509 of the respective pieces of content 520 have different sizes). In additional explanation, the size of each piece of content 520 is changed on the display screen 200A illustrated in FIG. 7 in accordance with a predetermined condition. Specifically, the size of the piece of content 520 is changed in accordance with the reference frequency or the like of the piece of content 520. More specifically, the higher the reference frequency, the larger the size of the piece of content 520.

Further, in this exemplary embodiment, a narrowing-down-operation receiving part (not illustrated) is displayed. The narrowing-down-operation receiving part is provided for receiving, from the project member, an operation for narrowing down the pieces of content 520.

In this exemplary embodiment, the pieces of content 520 may be narrowed down (filtered) by operating the narrowing-down-operation receiving part or by inputting a keyword in an input box (not illustrated) provided in the narrowing-down-operation receiving part.

More specifically, the pieces of content 520 may be narrowed down by using, as a key, information such as the number of reference times, a generation date and time, a creator, or a creation place.

Note that the display of the fourth display area 504 illustrated in FIG. 7 may also be provided on a display of a copier installed in a convenience store or the like.

More specifically, a user is authenticated by using the copier installed in the convenience store or the like and is thereby identified. If the user is one of the above-described project members, the same display as in the fourth display area 504 may be provided on the display of the copier.

This enables each project member to print any of the pieces of content 520 also in the convenience store or the like. In addition, the display screen to be displayed at the time of printing is a display screen familiar to the project member, and thus the printing of the piece of content 520 is facilitated.

Figure 8:
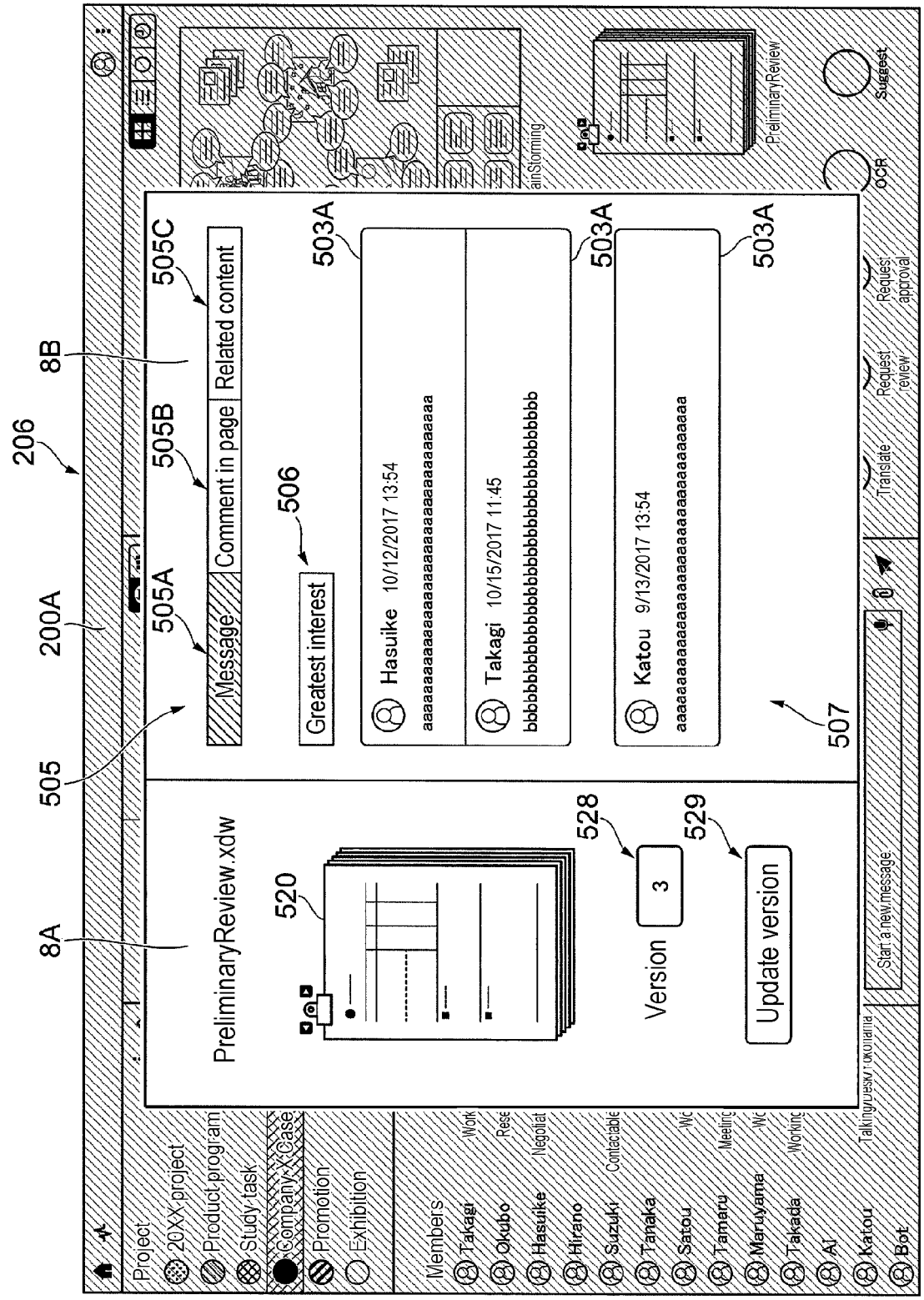
FIG. 8 is a view illustrating a different display screen displayed after one of project members performs an operation for selecting a piece of content displayed in the fourth display area.

FIG. 8 is a view illustrating a different display screen 200A displayed after a project member performs an operation for selecting a piece of content 520 displayed in the fourth display area 504.

Specifically, in this exemplary embodiment, performing the operation for selecting the piece of content 520 leads to the display screen 200A illustrated in FIG. 6B, but performing a different type of operation for selecting a piece of content 520 leads to a change to the display screen 200A illustrated in FIG. 8.

More specifically, in this exemplary embodiment, for example, double-clicking on the piece of content 520 as the selection operation leads to the display screen 200A illustrated in FIG. 6B, and performing an operation from a menu displayed by right-clicking leads to the display screen 200A illustrated in FIG. 8.

On the display screen 200A illustrated in FIG. 8, an enlarged-content display area 8A and a message display area 8B are provided.

In the enlarged-content display area 8A, the selected piece of content 520 is enlarged and displayed. The enlarged-content display area 8A is also provided with a version-information display area 528 and a version change button 529.

In the message display area 8B, messages 503A related to the selected piece of content 520 are displayed.

Specifically, like the description above (like the display illustrated in FIG. 6B), the messages 503A referring to the selected piece of content 520 and a message 503A having the selected piece of content 520 attached thereto are displayed also in the message display area 8B. Further, a related message such as a return message or a transmitted message is also displayed.

In other words, the display in FIG. 6B and the display in FIG. 8 use different display formats but have the same display contents.

Version information regarding the piece of content 520 thus enlarged and displayed is displayed in the version-information display area 528 of the enlarged-content display area 8A.

In this exemplary embodiment, a piece of content 520 before version change is also stored in the information memory 311 (see FIG. 5), and if a different version is selected by operating the version change button 529, the display in the version-information display area 528 is changed to the display indicating the different version.

In addition, if the different version is selected by operating the version change button 529, a piece of content 520 corresponding to the selected different version is displayed in the enlarged-content display area 8A.

Moreover, if the different version is selected by operating the version change button 529, messages 503A related to the piece of content 520 of the different version are displayed in the message display area 8B.

In this exemplary embodiment, after the piece of content 520 is updated, the piece of content 520 not updated and the piece of content 520 thus updated are stored in the information memory 311.

More specifically, after the user updates the piece of content 520, and after, for example, a message 503A with the updated piece of content 520 attached thereto is transmitted, the attached piece of content 520 (the updated piece of content 520) is stored in the information memory 311.

This also enables the piece of content 520 of the different version to be verified in this exemplary embodiment as described above.

The message display area 8B is provided with display-content change buttons 505, a display-order change button 506, and a message display area 507.

As the display-content change buttons 505, a message display button 505A, a comment-in-page display button 505B, and a related-content display button 505C are provided.

When the user selects the message display button 505A, the messages 503A related to the piece of content 520 displayed in the enlarged-content display area 8A are displayed in the message display area 8B.

When the user selects the comment-in-page display button 505B or the related-content display button 505C, the display of the message display area 8B is changed to different display. The display in a case of selecting the comment-in-page display button 505B or the related-content display button 505C will be described later.

In this exemplary embodiment, when the display-order change button 506 is operated, the order of displaying the messages 503A in the message display area 507 is changed.

Specifically, the display-order change button 506 is a pull-down button. When the user operates the display-order change button 506, the messages 503A are displayed, for example, in the order from the greatest interest or in a time series.

Whether to be of great interest in the order from the greatest interest is determined on the basis of the number of tags as described above (see the reference sign 6P in FIG. 6A) or the number of affirmative evaluations such as "Like" (not illustrated).

Note that the messages 503A may be narrowed down (filtered) by using a name or the like of a project member as a key, but this is not illustrated in FIG. 8.

Specifically, an input box may be provided. The messages 503A may be narrowed down on the basis of information regarding the project member input in the input box, and the messages 503A displayed in the message display area 507 may be made different.

Figure 9:
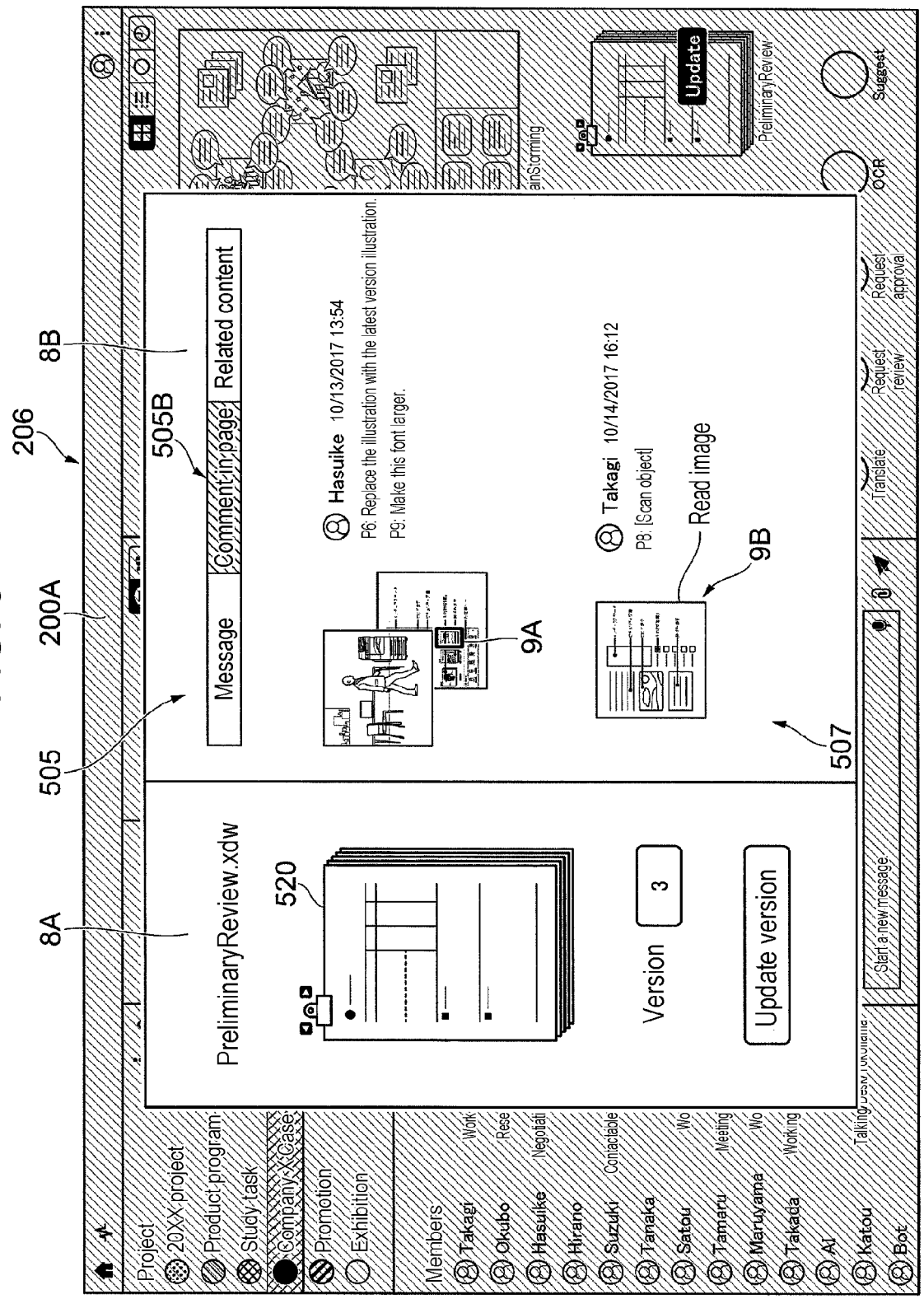
FIG. 9 is a view illustrating the display screen displayed after the user selects a comment-in-page display button.

FIG. 9 is a view illustrating the display screen 200A displayed after the user selects the comment-in-page display button 505B illustrated in FIG. 8.

If the user selects the comment-in-page display button 505B, a comment written for the piece of content 520 displayed in the enlarged-content display area 8A is displayed in the message display area 8B.

In the display example illustrated in FIG. 9, a comment for requesting replacing the illustration in the piece of content 520 with the latest version illustration is displayed. Further, a comment for requesting making larger the font of characters in the piece of content 520 is displayed.

Further, in the display example illustrated in FIG. 9, an image (the image denoted by a reference sign 9A) is displayed, the image being for identifying characters font of which is to be made larger and being drawn by a user for the piece of content 520.

Further, on the display screen 200A illustrated in FIG. 9, a read image obtained by scanning a document (a read image obtained by reading the document with a scanner (an image reader)) is displayed, as denoted by a reference sign 9B.

More specifically, this example exemplifies a case where a project member considers their document is related to the piece of content 520 displayed in the enlarged-content display area 8A. This example further illustrates a case where the user performs a reading operation of the document and where the read image is stored in the information memory 311 and is further displayed in the message display area 8B.

Figure 10:
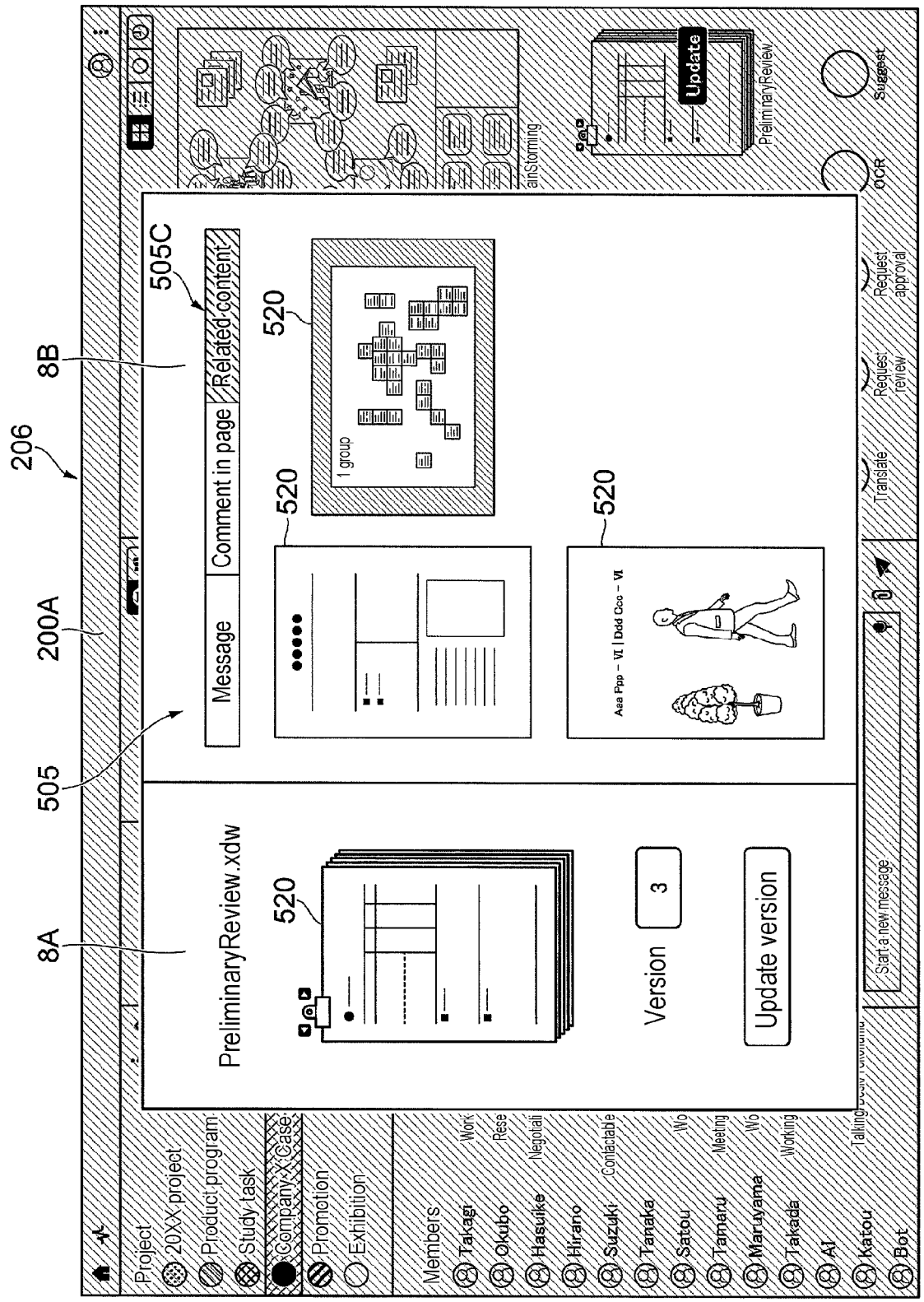
FIG. 10 is a view illustrating the display screen displayed in a case where the project member selects a related-content display button.

FIG. 10 is a view illustrating the display screen 200A displayed when the project member selects the related-content display button 505C.

When the project member selects the related-content display button 505C, pieces of content 520 related to the piece of content 520 displayed in the enlarged-content display area 8A are displayed in the message display area 8B.

Note that as an example of the related pieces of content 520, a piece of content 520 transmitted together with the piece of content 520 displayed in the enlarged-content display area 8A may be cited. In other words, multiple pieces of content 520 are attached to one message, and at least one of the pieces of content 520 that is different from the piece of content 520 displayed in the enlarged-content display area 8A may be cited as an example.

In addition, as an example of the related pieces of content 520, a piece of content 520 attached to a message 503A related to a message 503A to which the piece of content 520 displayed in the enlarged-content display area 8A is attached may be cited.

Specifically, a piece of content 520 attached to a return message responding to the message 503A to which the piece of content 520 displayed in the enlarged-content display area 8A is attached may be cited as an example.

In addition, if the message 503A to which the piece of content 520 displayed in the enlarged-content display area 8A is attached is a return message, a piece of content 520 attached to a transmitted message that is the source of the return message may be cited as an example.

Figure 11:
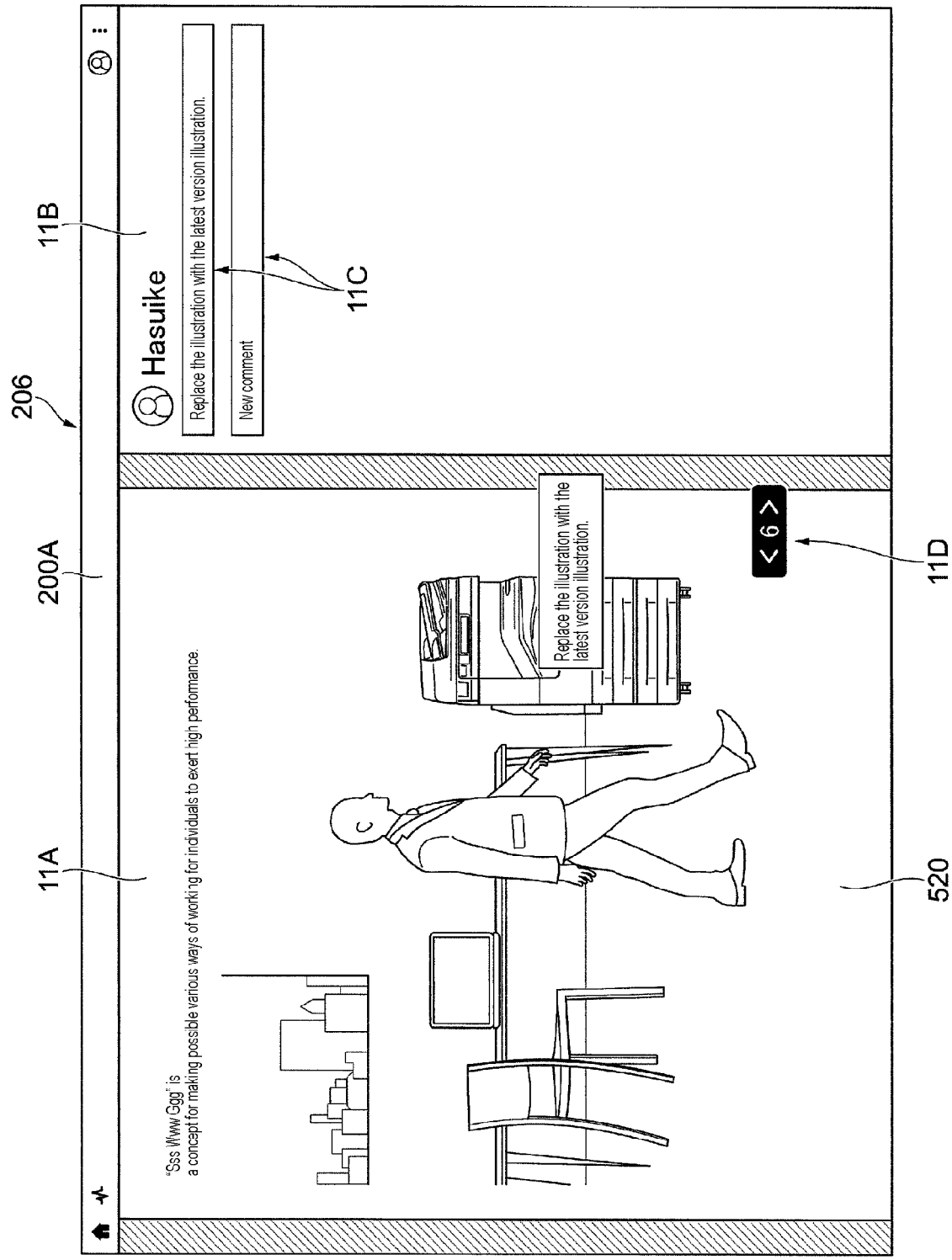
FIG. 11 is a view illustrating an example display screen displayed when a project member writes a comment on the piece of content.

FIG. 11 is a view illustrating an example of the display screen 200A displayed when a project member writes a comment on the piece of content 520.

This exemplary embodiment is configured to allow a comment on any of pages constituting a piece of content 520 while previewing the piece of content 520.

Specifically, in this exemplary embodiment, when a predetermined operation accompanying selection of a piece of content 520 is performed by the project member on the display screen 200A illustrated in FIG. 6A or 7, the display screen 200A is changed to the display screen 200A illustrated in FIG. 11.

The display screen 200A illustrated in FIG. 11 is provided with a preview area 11A in the left part of FIG. 11 and a comment input area 11B in the right part of the display screen 200A. The preview area 11A and the comment input area 11B are respectively provided for previewing the piece of content 520 and for inputting a comment.

This exemplary embodiment is configured to allow a comment on the piece of content 520 without opening the piece of content 520.

More specifically, this exemplary embodiment is configured to refer to any page of the piece of content 520 without launching dedicated software to open the piece of content 520 (the piece of content 520 is displayed in the preview area 11A). Further, in this exemplary embodiment, typing text in an input box 11C in the comment input area 11B enables commenting on the piece of content 520.

Further, when a page change button 11D is operated on the display screen 200A illustrated in FIG. 11, a displayed page of the piece of content 520 displayed in the preview area 11A is thereby changed.

In this exemplary embodiment, the comment input by the user in the comment input area 11B is stored in the information memory 311 (see FIG. 5) in association with the piece of content 520 displayed in the preview area 11A.

More specifically, the comment input by the project member in the comment input area 11B is stored in the information memory 311 in association with the corresponding page of the piece of content 520.

In this exemplary embodiment, if a project member selects the comment-in-page display button 505B as illustrated in FIG. 9, a comment input by a different project member in the comment input area 11B illustrated in FIG. 11 is displayed in the message display area 507 illustrated in FIG. 9.

Figure 12:
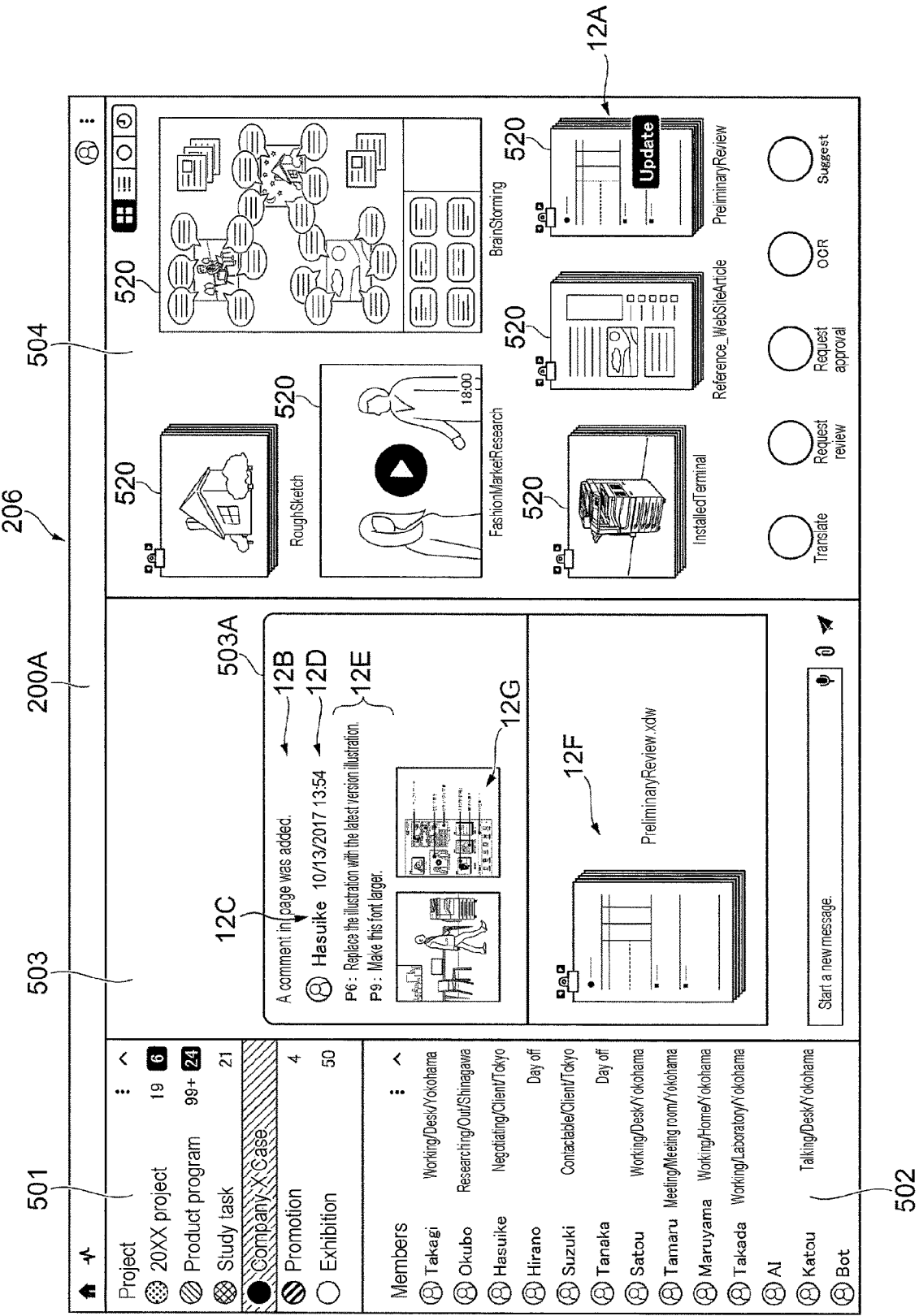
FIG. 12 is a view illustrating the display screen displayed after the comment on the piece of content is written.

FIG. 12 is a view illustrating the display screen 200A displayed after the comment on the piece of content 520 is written.

In this exemplary embodiment, when the comment on the piece of content 520 is written, a notification indicating that the comment is written is displayed in the third display area 503 as illustrated in FIG. 12.

In other words, in this exemplary embodiment, when a project member performs predetermined processing related to the piece of content 520, a notification indicating that the predetermined processing is performed is displayed in the third display area 503. The details of the processing performed by one of the project members is thereby notified to the other project members.

The example illustrated in FIG. 12 exemplifies a case where there is a comment on a piece of content 520 denoted by a reference sign 12A. In this case, Update is displayed in association with the piece of content 520.

In other words, an indicator for identifying the piece of content 520 processed by the project member is displayed.

In the third display area 503, the name of the project member who writes the comment (see a reference sign 12C), the date and time (see a reference sign 12D) when the comment is written, the content of the comment (see a reference sign 12E), and the piece of content 520 commented (see a reference sign 12F) are displayed to indicate that the piece of content 520 is commented (see a reference sign 12B). If the project member writes a note on the piece of content 520, the content of the note is also displayed (see a reference sign 12G).

In this exemplary embodiment, when a comment or a note is written in the piece of content 520, information for identifying the piece of content 520 having the comment or the note is displayed in not only the fourth display area 504 but also the third display area 503 (the message display area).

This enables the project members to easily recognize the piece of content 520 having the comment or the note compared with a case where the information for identifying the piece of content 520 having the comment or the note is displayed only in the fourth display area 504.

Figure 13:
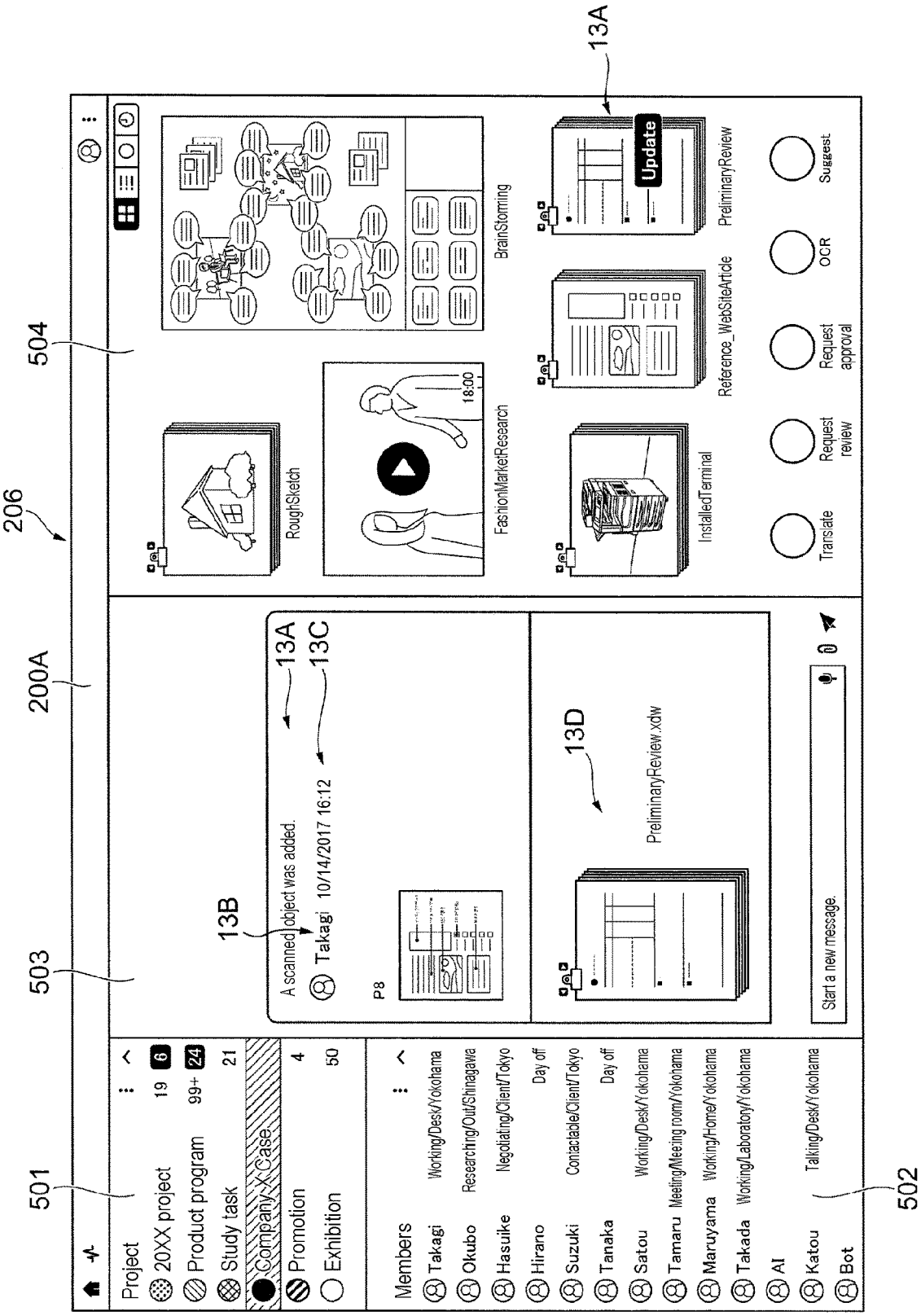
FIG. 13 is a view illustrating the display screen displayed when a new piece of content is stored in an information memory.

FIG. 13 is a view illustrating the display screen 200A displayed when a new piece of content 520 is stored in the information memory 311.

In this exemplary embodiment, by performing a copy-and-paste operation or a drag-and-drop operation in a state where the display screen 200A illustrated in FIG. 6A or 7 is displayed, a new piece of content 520 may be pasted into (added to) the fourth display area 504.

When a new piece of content 520 (for example, a piece of content 520 denoted by a reference sign 13A in FIG. 13) is pasted into the fourth display area 504, the piece of content 520 is stored in the information memory 311 and is also displayed in the fourth display area 504.

Further, when the new piece of content 520 is pasted, the name of a project member who adds the piece of content 520 (see a reference sign 13B) and the date and time when the piece of content 520 is added (see a reference sign 13C) are displayed in the third display area 503 (the message display area) to indicate that the new piece of content 520 is added (see the reference sign 13A) as illustrated in FIG. 13.

Further, the added piece of content 520 is displayed in the third display area 503 (see a reference sign 13D).

In this exemplary embodiment, when the piece of content 520 is added, information regarding the added piece of content 520 is displayed in not only the fourth display area 504 but also the third display area 503.

This enables the project members to easily recognize the newly added piece of content 520 compared with a case where the information for identifying the added piece of content 520 is displayed only in the fourth display area 504.

Figure 14:
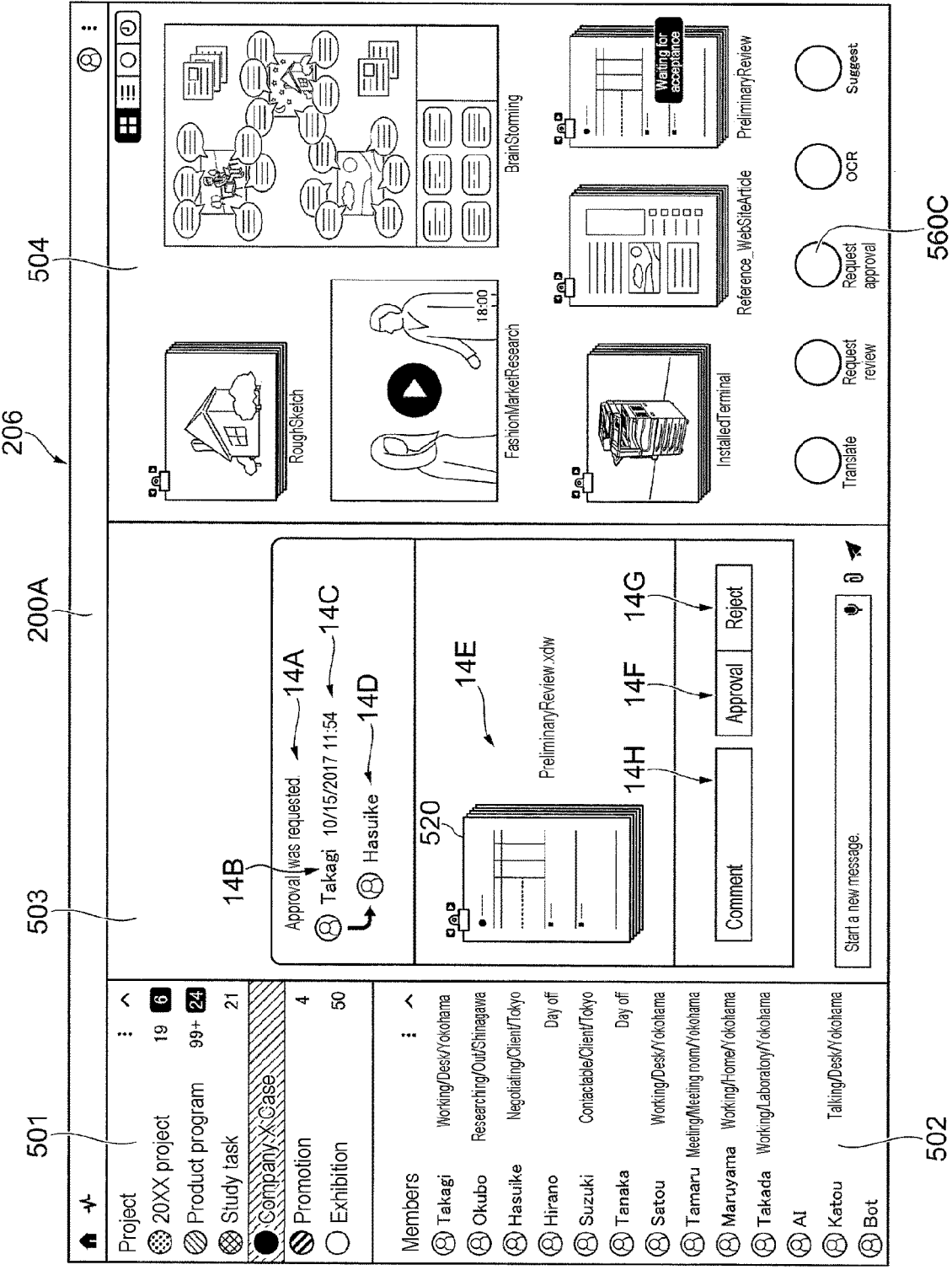
FIG. 14 is a view illustrating the display screen displayed when approval of the piece of content is requested.

FIG. 14 is a view illustrating the display screen 200A displayed when approval of the piece of content 520 is requested.

In this exemplary embodiment, the approval selection image 560C is displayed in the fourth display area 504 as described above. If the piece of content 520 desired to be approved is moved onto the approval selection image 560C, a notification indicating that approval is requested is displayed in the third display area 503 as illustrated in FIG. 14.

Specifically, the name of a project member who requests approval (see a reference sign 14B), the date and time when the approval is requested (see a reference sign 14C), and the name of a project member (an approver) requested to approve the piece of content 520 (see a reference sign 14D) are displayed to indicate that approval is requested (see a reference sign 14A). Further, the piece of content 520 to be approved is displayed (see a reference sign 14E).

Further, an Approve button that is a button to be selected when the piece of content 520 is approved (see a reference sign 14F) and a Reject button that is a button selected when the piece of content 520 is not approved (see a reference sign 14G) are displayed. Further, a comment input box for the approver (see a reference sign 14H) is displayed.

If the approver judges that the piece of content 520 may be approved, the approver selects the Approve button (see the reference sign 14F). If the approver judges that the piece of content 520 may not be approved, the approver selects the Reject button (see the reference sign 14G).

Thereafter, a result (result of whether the piece of content 520 is approved or not approved) is displayed in the third display area 503 (the message display area), but illustration of the result is omitted.

Also on the display screen 200A like the description above, an operation (for approval) performed by one of the project members is displayed in the third display area 503 that is the shared display area, and the operation performed by the project member is notified to the other project members.

Information regarding the operation performed by the project member is thereby shared by all of the project members.

In this exemplary embodiment, simply operating the third display area 503 enables the approver to perform the approval processing. In other words, the approver may perform the approval processing on the display screen 200A for managing the projects.

To perform the approval processing, for example, there is a method in which an e-mail or the like is separately transmitted to the approver to request approval, but it is laborious in this case. In addition, in this case, it is difficult for the other project members to share information regarding the approval processing.

In contrast, this exemplary embodiment enables the approval processing to be performed on the display screen 200A for managing the projects and thus facilitates the approval processing. In addition, the information regarding the approval processing is displayed on the shared screen and thus is shared by all of the project members.

Note that in this exemplary embodiment, the Approve button, the Reject button, and the comment input box are configured to be displayed on the display screen 200A of the approver only and not to allow approval of the project members other than the approver.

Figure 15:
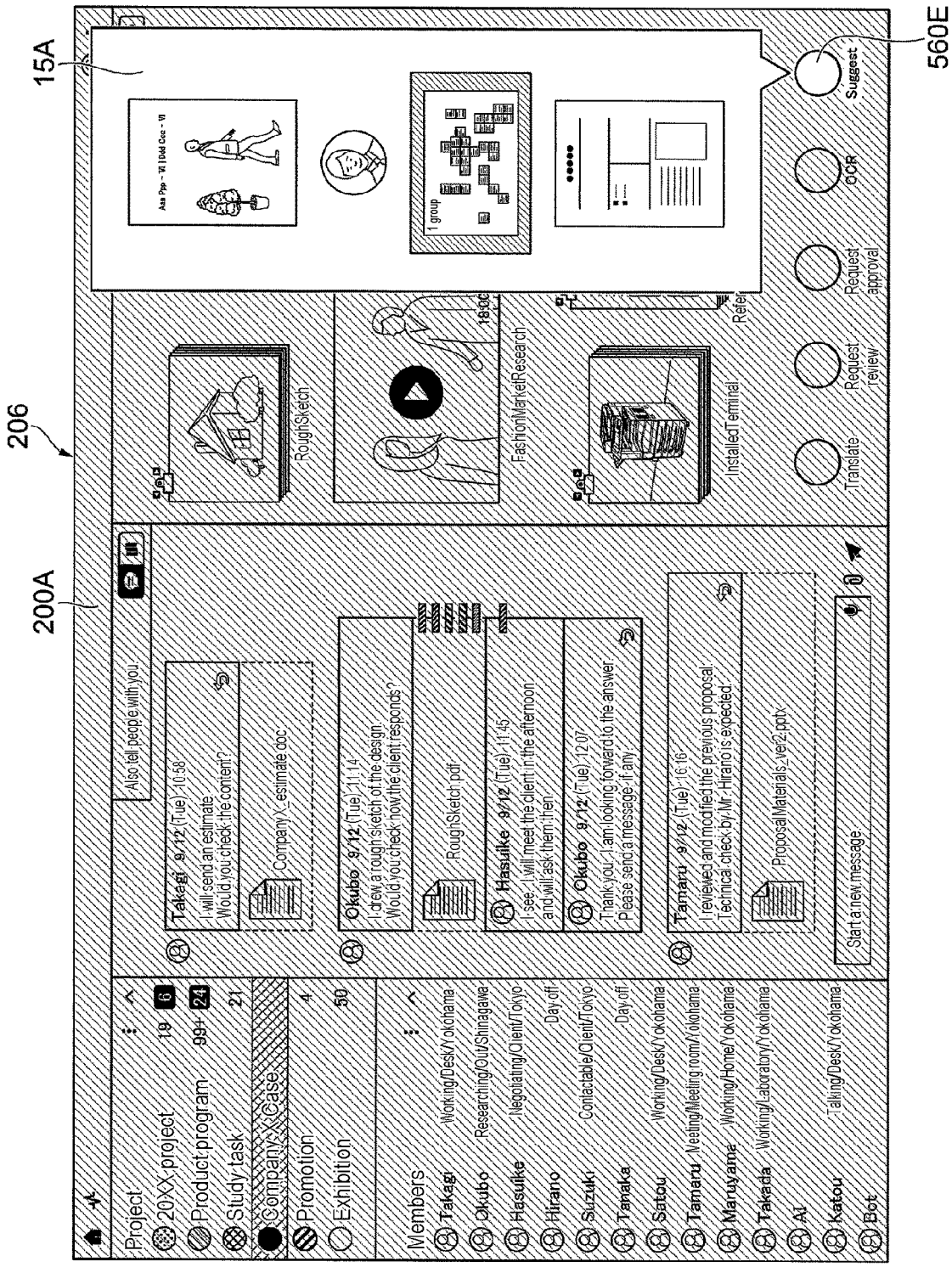
FIG. 15 is a view illustrating the display screen displayed when a user selects a suggestion selection image.

FIG. 15 is a view illustrating the display screen 200A displayed when the user selects the suggestion selection image 560E.

In this exemplary embodiment, only the suggestion selection image 560E may be selected. In this case, an image denoted by a reference sign 15A is displayed.

In additional explanation, the case where the piece of content 520 and the suggestion selection image 560E are selected has been described (the case where the selected piece of content 520 is moved onto the suggestion selection image 560E has been described), but FIG. 15 illustrates a case where only the suggestion selection image 560E is selected. In this case, the processing unit 313 (see FIG. 5) performs processing and gives a suggestion.

Specifically, after the suggestion selection image 560E is selected, the processing unit 313 of the management server 300 analyzes information regarding the content of each message 503A stored in the information memory 311, the content of each piece of content 520 stored in the information memory 311, the project members, and the like.

Further, the processing unit 313 takes the analysis result into consideration and searches the management server 300 and an external different server for information.

The processing unit 313 identifies information to be suggested to the project members from among pieces of information stored in the management server 300 and pieces of information stored in the different server or the like.

The management server 300 transmits the identified information to the terminal apparatus 200. Material suggested by the management server 300 is thereby displayed on the terminal apparatus 200 as illustrated in FIG. 15.

More specifically, for example, useful information and information regarding a helpful person for promoting a project are suggested.

Note that the suggested material is not limited to text information, a still image, and the like, and a moving image and a sound-related file may be suggested.

Others

Each piece of content 520 may have an image added thereto, the image including information for identifying the piece of content 520 (such as a code image). Note that, for example, the processing unit 313 that is an example of an adding unit (see FIG. 5) adds the image.

In this case, when the piece of content 520 is printed, information for identifying the piece of content 520 is added to a sheet having the piece of content 520 printed thereon. More specifically, for example, a code image such as a barcode or two-dimensional barcode is formed, and thereby the information for identifying the piece of content 520 is added thereto.

Thereafter, for example, when the sheet is read by scanning, the read image thereby includes the code image.

In this exemplary embodiment, if the read image is stored in the information memory 311 (in the management server 300), the code image in the read image is analyzed, and thereby the piece of content 520 (the piece of content 520 based on which the printing is performed) is identified. The piece of content 520 and the read image are then associated with each other.

This processing facilitates association between, for example, a modification instruction or the like handwritten by a project member and the piece of content 520.

Note that the above-described read image may be stored in the information memory 311, for example, by performing a drag-and-drop operation or a copy-and-paste operation of the read image into the fourth display area 504. Alternatively, the read image may be directly transmitted from a scanner to the management server 300.

When multiple notes on the piece of content 520 are displayed on the terminal apparatus 200, display of the multiple notes may be configured not to be simultaneously provided for one still image (a still image representing the piece of content 520). Instead, for example, the notes may appear in order from the least recent note. In other words, the display may be changed in order, that is, an indicator for a note may be added to one another.

If multiple project members write a note, the color of the note may be made different for each project member.

The foregoing description of the exemplary embodiments of the present invention have been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
    a memory that stores a plurality of conversation messages between users;
    a display that concurrently displays a first display area and a second display area, the first display area presenting a plurality of selectable thumbnails each representing a respective file; and
    a processor, being configured to:
        receive a user input selecting a thumbnail from among the plurality of selectable thumbnails displayed in the first display area, and
        in response to the user input, extract a conversation message referring to a file represented by the selected thumbnail from the plurality of conversation messages stored in the memory, and
        control the display to display the conversation message in the second display area while concurrently displaying the selected thumbnail without opening the file in the first display area.

2. The information processing system according to claim 1,
    wherein the display also displays a conversation message transmitted by a user different from the user who selects the thumbnail.

3. The information processing system according to claim 1,
    wherein the display displays a plurality of the conversation messages extracted by the processor, the plurality of conversation messages being arranged in a predetermined order.

4. The information processing system according to claim 3,
    wherein the display displays the plurality of the conversation messages extracted by the processor, the plurality of conversation messages being arranged in a time series.

5. The information processing system according to claim 1,
    wherein the user selects the thumbnail from among the plurality of selectable thumbnails displayed in the first display area, the display erases, from a display screen, one or more of the conversation messages, the one or more of the conversation messages being other than the conversation message referring to the file represented by the selected thumbnail.

6. The information processing system according to claim 1,
    wherein the plurality of selectable thumbnails displayed in the first display area and the conversation messages displayed in the second display area are displayed on a display screen that is shared by the plurality of users.

7. The information processing system according to claim 6,
    wherein the first display area and the second display area are adjacent to each other.

8. The information processing system according to claim 1,
    wherein the display displays an image in the second display area, the image representing the thumbnail selected by the user.

9. The information processing system according to claim 1,
    wherein the display further displays a conversation message related to a conversation message included in a plurality of the conversation messages extracted by the processor.

10. The information processing system according to claim 9,
    wherein if a return message is included in a return message responding to the conversation message included in the plurality of conversation messages extracted by the processor and/or is included in the plurality of conversation messages extracted by the processor, the display further displays a transmitted message that is a source of the return message included in the return message responding to the conversation message and/or included in the plurality of extracted conversation messages.

11. The information processing system according to claim 1,
    wherein the display displays the plurality of conversation messages and displays a page different from a cover for at least one of the plurality of conversation messages.

12. The information processing system according to claim 1, the processor further being configured to:
    perform processing associated with a predetermined position of a display screen when the conversation message included in the plurality of conversation messages displayed by the display on the display screen is moved to the predetermined position.

13. An information processing apparatus comprising:
    a memory that stores conversation messages between users;
    a processor, being configured to
        receive a user input selecting a thumbnail from among a plurality of selectable thumbnails displayed a first display area of a display screen, wherein the first display area presents the plurality of selectable thumbnails and each of the plurality of selectable thumbnails represents a respective file,
        in response to the user input, extract a conversation message referring to a file represented by the selected thumbnail from the plurality of conversation messages stored in the memory, and
        output a display-related instruction to an external terminal to display the conversation message in a second display area of the display screen while concurrently displaying the selected thumbnail without opening the file in the first display area.

14. A non-transitory computer readable medium storing a program causing a computer to execute a process comprising:
    displaying a first display area and a second display area on a display, the first display area presenting a plurality of selectable thumbnails each representing a respective file;

receiving a user input selecting a thumbnail from among the plurality of selectable thumbnails displayed in the first display area; and in response to the user input, extracting, from a storage storing a plurality of conversation messages between users, a conversation message referring to a file represented by the selected thumbnail, and displaying the conversation message in the second display area while concurrently displaying the selected thumbnail without opening the file in the first display area.

15. A non-transitory computer readable medium according to claim 14, the process further comprising:

in response to other user input selecting the thumbnail, displaying a menu for operating a file represented by the selected thumbnail.

16. A non-transitory computer readable medium according to claim 14, the process further comprising:

in response to other user input selecting the thumbnail, requesting an approval for a file represented by the selected thumbnail to the users.

17. An information processing method comprising:

displaying a first display area and a second display area on a display, the first display area presenting a plurality of selectable thumbnails each representing a respective file;

receiving a user input selecting a thumbnail from among the plurality of selectable thumbnails displayed in the first display area; and in response to the user input, extracting, from a memory storing a plurality of conversation messages between users, a conversation message referring to a file represented by the selected thumbnail, and displaying the conversation message in the second display area while concurrently displaying the selected thumbnail without opening the file in the first display area.

18. An information processing method according to claim 17, further comprising:

in response to other user input selecting the thumbnail, displaying a menu for operating a file represented by the selected thumbnail.

19. An information processing method according to claim 17, further comprising:

in response to other user input selecting the thumbnail, requesting an approval for a file represented by the selected thumbnail to the users.

20. The information processing system according to claim 1, the processor being further configured to, in response to other user input selecting the thumbnail, control the display to display a menu for operating a file represented by the selected thumbnail in response to the other user input.

21. The information processing system according to claim 1, the processor being further configured to, in response to other user input selecting the thumbnail, request an approval for a file represented by the selected thumbnail to the users.

22. The information processing system according to claim 13, the processor being further configured to, in response to other user input selecting the thumbnail, control the display to display a menu for operating a file represented by the selected thumbnail, output the display-related instruction to the external terminal to display a menu for operating a file represented by the selected thumbnail in response to the other user input.

23. The information processing system according to claim 13, the processor being further configured to, in response to other user input selecting the thumbnail, request an approval for a file represented by the selected thumbnail to the users.

* * * * *